(12) United States Patent
Dowlatkhah et al.

(10) Patent No.: US 10,516,996 B2
(45) Date of Patent: *Dec. 24, 2019

(54) METHOD AND APPARATUS FOR DYNAMIC INSTANTIATION OF VIRTUAL SERVICE SLICES FOR AUTONOMOUS MACHINES

(71) Applicants: AT&T Mobility II LLC, Atlanta, GA (US); AT&T Intellectual Property I, L.P., Atlanta, GA (US)

(72) Inventors: Sangar Dowlatkhah, Alpharetta, GA (US); Erie Lai Har Lau, Redmond, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,780

(22) Filed: Sep. 11, 2018

(65) Prior Publication Data

US 2019/0191305 A1  Jun. 20, 2019

Related U.S. Application Data

(63) Continuation of application No. 15/845,323, filed on Dec. 18, 2017, now Pat. No. 10,104,548.

(51) Int. Cl.
*H04W 4/44* (2018.01)
*H04W 8/24* (2009.01)
(Continued)

(52) U.S. Cl.
CPC ........ *H04W 12/06* (2013.01); *H04B 7/15507* (2013.01); *H04W 4/44* (2018.02); *H04W 8/24* (2013.01); *H04W 76/10* (2018.02)

(58) Field of Classification Search
CPC ......... H04W 4/44; H04W 8/24; H04W 76/10; H04B 7/15507
See application file for complete search history.

(56) References Cited

U.S. PATENT DOCUMENTS

| 4,285,469 A | 8/1981 | Huang |
| 5,671,253 A | 9/1997 | Stewart |
(Continued)

FOREIGN PATENT DOCUMENTS

| CN | 102045896 A | 5/2011 |
| CN | 105052074 | 2/2014 |
(Continued)

OTHER PUBLICATIONS

"Cell Site on Light Trucks", 2007, 1 page.
(Continued)

*Primary Examiner* — Asghar H Bilgrami
(74) *Attorney, Agent, or Firm* — Guntin & Gust, PLC; Douglas Schnabel

(57) ABSTRACT

Aspects of the subject disclosure may include, for example, receiving from a first cellular-capable apparatus operating in a first area outside of coverage of a cellular network, an authentication request to connect to a non-stationary cellular host, determining, according to the authentication request, whether the first cellular-capable apparatus is subscribed to a first service of a plurality of services supported by the non-stationary cellular host, and, in response, instantiating at the non-stationary cellular host a first set of virtual network functions required to facilitate the service for the cellular-capable apparatus, and facilitating the service to the first cellular-capable apparatus according to a first set of virtual network functions to generate first information associated with the first cellular-capable apparatus. Other embodiments are disclosed.

20 Claims, 7 Drawing Sheets

(51) Int. Cl.
*H04W 76/10* (2018.01)
*H04B 7/155* (2006.01)
*H04W 12/06* (2009.01)

(56) References Cited

U.S. PATENT DOCUMENTS

| | | | |
|---|---|---|---|
| 5,970,408 A | 10/1999 | Carlsson et al. | |
| 6,246,883 B1 | 6/2001 | Lee | |
| 6,795,686 B2 | 9/2004 | Master et al. | |
| 6,873,620 B1 | 3/2005 | Coveley et al. | |
| 7,167,923 B2 | 1/2007 | Lo et al. | |
| 7,206,294 B2 | 4/2007 | Garahi et al. | |
| 7,486,678 B1 | 2/2009 | Devanagondi et al. | |
| 7,532,640 B2 | 5/2009 | Kelly et al. | |
| 7,660,583 B2 | 2/2010 | Pekonen et al. | |
| 7,787,414 B2 | 8/2010 | Le Faucheur et al. | |
| 8,145,208 B2 | 3/2012 | Chari et al. | |
| 8,234,650 B1 | 7/2012 | Eppstein et al. | |
| 8,385,977 B2 | 2/2013 | Fein et al. | |
| 8,593,968 B2 | 11/2013 | Santiago et al. | |
| 8,621,058 B2 | 12/2013 | Eswaran et al. | |
| 8,676,219 B2 | 3/2014 | Lennvall et al. | |
| 8,868,069 B2 | 10/2014 | Bennett et al. | |
| 9,077,478 B1 | 7/2015 | Schmidtke et al. | |
| 9,078,284 B2 | 7/2015 | Richardson | |
| 9,119,016 B2 | 8/2015 | Durand et al. | |
| 9,225,587 B2 | 12/2015 | Zhang et al. | |
| 9,225,652 B2 | 12/2015 | Li et al. | |
| 9,245,246 B2 | 1/2016 | Breitgand et al. | |
| 9,270,815 B2 | 2/2016 | Shaw et al. | |
| 9,298,515 B2 | 3/2016 | McMurry et al. | |
| 9,301,333 B2 | 3/2016 | Choi et al. | |
| 9,305,301 B2 | 4/2016 | Paul et al. | |
| 9,306,909 B2 | 4/2016 | Koponen et al. | |
| 9,311,108 B2 | 4/2016 | Cummings | |
| 9,330,156 B2 | 5/2016 | Satapathy | |
| 9,369,390 B2 | 6/2016 | Bantukul et al. | |
| 9,378,043 B1 | 6/2016 | Chen et al. | |
| 9,384,028 B1 | 7/2016 | Felstaine et al. | |
| 9,391,897 B2 | 7/2016 | Sparks et al. | |
| 9,392,471 B1 | 7/2016 | Thomas et al. | |
| 9,401,962 B2 | 7/2016 | Parker et al. | |
| 9,407,542 B2 | 8/2016 | Vasseur et al. | |
| 9,436,443 B2 | 9/2016 | Chiosi et al. | |
| 9,445,341 B2 | 9/2016 | Spinelli et al. | |
| 9,450,823 B2 | 9/2016 | Rhee et al. | |
| 9,461,729 B2 | 10/2016 | Djukic et al. | |
| 9,497,572 B2 | 11/2016 | Britt et al. | |
| 9,503,969 B1 | 11/2016 | Zakaria et al. | |
| 9,544,120 B2 | 1/2017 | Scholten et al. | |
| 9,553,806 B2 | 1/2017 | Anand | |
| 9,559,980 B2 | 1/2017 | Li et al. | |
| 9,565,074 B2 | 2/2017 | Lehane et al. | |
| 9,602,422 B2 | 3/2017 | Padmanabhan et al. | |
| 9,762,402 B2 | 9/2017 | Batz et al. | |
| 9,907,113 B2 * | 2/2018 | Cheng | H04W 84/005 |
| 10,193,984 B2 | 1/2019 | Haddad et al. | |
| 2003/0145106 A1 | 7/2003 | Brown et al. | |
| 2004/0103308 A1 | 5/2004 | Paller et al. | |
| 2005/0003010 A1 | 1/2005 | Cohen et al. | |
| 2006/0029097 A1 | 2/2006 | McGee et al. | |
| 2007/0140269 A1 | 6/2007 | Donnelli et al. | |
| 2008/0285492 A1 | 11/2008 | Vesterinen et al. | |
| 2009/0129296 A1 | 5/2009 | Grinshpun et al. | |
| 2010/0234071 A1 | 9/2010 | Shabtay et al. | |
| 2011/0182227 A1 | 7/2011 | Rune et al. | |
| 2011/0282931 A1 | 11/2011 | Chen et al. | |
| 2012/0140749 A1 | 6/2012 | Caldwell et al. | |
| 2012/0303828 A1 | 11/2012 | Young et al. | |
| 2013/0010756 A1 | 1/2013 | Liang et al. | |
| 2013/0046665 A1 | 2/2013 | Zabawskyj et al. | |
| 2013/0072199 A1 | 3/2013 | Miyagawa et al. | |
| 2013/0337872 A1 | 12/2013 | Fertl et al. | |
| 2014/0023044 A1 | 1/2014 | Sjölinder et al. | |
| 2014/0070892 A1 | 3/2014 | Matsuoka et al. | |
| 2014/0220923 A1 * | 8/2014 | Shoshan | H04W 4/90 455/404.1 |
| 2014/0254382 A1 | 9/2014 | Randriamasy et al. | |
| 2014/0259012 A1 | 9/2014 | Nandlall et al. | |
| 2014/0269435 A1 | 9/2014 | McConnell et al. | |
| 2014/0301192 A1 | 10/2014 | Lee et al. | |
| 2014/0307556 A1 | 10/2014 | Zhang et al. | |
| 2014/0349611 A1 | 11/2014 | Kant et al. | |
| 2014/0376454 A1 | 12/2014 | Boudreau et al. | |
| 2014/0376555 A1 | 12/2014 | Choi et al. | |
| 2015/0055623 A1 | 2/2015 | Li | |
| 2015/0063166 A1 | 3/2015 | Sif et al. | |
| 2015/0067676 A1 | 3/2015 | Madani et al. | |
| 2015/0097731 A1 * | 4/2015 | Russell | G01S 19/48 342/450 |
| 2015/0109967 A1 | 4/2015 | Hogan et al. | |
| 2015/0113100 A1 | 4/2015 | Tweedale et al. | |
| 2015/0139238 A1 | 5/2015 | Pourzandi et al. | |
| 2015/0154258 A1 | 6/2015 | Xiong et al. | |
| 2015/0163159 A1 | 6/2015 | DeCusatis et al. | |
| 2015/0172115 A1 | 6/2015 | Nguyen et al. | |
| 2015/0200844 A1 | 7/2015 | Zhu et al. | |
| 2015/0236898 A1 | 8/2015 | Bonnier et al. | |
| 2015/0237556 A1 * | 8/2015 | Giloh | H04W 36/30 455/436 |
| 2015/0257012 A1 | 9/2015 | Zhang | |
| 2015/0257038 A1 | 9/2015 | Scherzer | |
| 2015/0295833 A1 | 10/2015 | Mizukoshi et al. | |
| 2015/0304281 A1 | 10/2015 | Kasturi et al. | |
| 2015/0319078 A1 | 11/2015 | Lee et al. | |
| 2015/0350102 A1 | 12/2015 | Leon-Garcia et al. | |
| 2015/0358236 A1 | 12/2015 | Roach et al. | |
| 2015/0363219 A1 | 12/2015 | Kasturi et al. | |
| 2015/0378753 A1 | 12/2015 | Phillips et al. | |
| 2015/0382278 A1 | 12/2015 | Fallon et al. | |
| 2016/0014787 A1 | 1/2016 | Zhang et al. | |
| 2016/0021588 A1 | 1/2016 | Kamdar et al. | |
| 2016/0044136 A1 | 2/2016 | Schiff et al. | |
| 2016/0073278 A1 | 3/2016 | Roessler et al. | |
| 2016/0080484 A1 | 3/2016 | Earl | |
| 2016/0088092 A1 | 3/2016 | Cardona-Gonzalez et al. | |
| 2016/0094255 A1 | 3/2016 | Meredith et al. | |
| 2016/0094395 A1 | 3/2016 | Hu | |
| 2016/0094641 A1 | 3/2016 | Rahman et al. | |
| 2016/0094668 A1 | 3/2016 | Chang et al. | |
| 2016/0095019 A1 | 3/2016 | Cui et al. | |
| 2016/0095042 A1 | 3/2016 | Wadhwa | |
| 2016/0105821 A1 | 4/2016 | Senarath et al. | |
| 2016/0105893 A1 | 4/2016 | Senarath et al. | |
| 2016/0112327 A1 | 4/2016 | Morris et al. | |
| 2016/0112335 A1 | 4/2016 | Bouanen et al. | |
| 2016/0112903 A1 | 4/2016 | Kaushik et al. | |
| 2016/0113018 A1 | 4/2016 | Li | |
| 2016/0127169 A1 | 5/2016 | Bull et al. | |
| 2016/0127230 A1 | 5/2016 | Cui et al. | |
| 2016/0127239 A1 | 5/2016 | Kahn et al. | |
| 2016/0142282 A1 | 5/2016 | Guo | |
| 2016/0150421 A1 | 5/2016 | Li et al. | |
| 2016/0150448 A1 | 5/2016 | Perras et al. | |
| 2016/0156513 A1 | 6/2016 | Zhang et al. | |
| 2016/0164787 A1 | 6/2016 | Roach et al. | |
| 2016/0212017 A1 | 7/2016 | Li et al. | |
| 2016/0218948 A1 | 7/2016 | Djukic | |
| 2016/0218971 A1 | 7/2016 | Basunov | |
| 2016/0219076 A1 | 7/2016 | Paczkowski et al. | |
| 2016/0234730 A1 | 8/2016 | John et al. | |
| 2016/0248860 A1 | 8/2016 | Dunbar et al. | |
| 2016/0249353 A1 | 8/2016 | Nakata et al. | |
| 2016/0262044 A1 | 9/2016 | Calin et al. | |
| 2016/0286043 A1 | 9/2016 | John et al. | |
| 2016/0294732 A1 | 10/2016 | Chou et al. | |
| 2016/0294734 A1 | 10/2016 | Jang et al. | |
| 2016/0295614 A1 | 10/2016 | Lee et al. | |
| 2016/0301566 A1 | 10/2016 | Ramasubramani et al. | |
| 2016/0352645 A1 | 12/2016 | Senarath et al. | |
| 2016/0352924 A1 | 12/2016 | Senarath et al. | |
| 2016/0353268 A1 | 12/2016 | Senarath et al. | |
| 2016/0353367 A1 | 12/2016 | Vrzic et al. | |
| 2016/0353422 A1 | 12/2016 | Vrzic et al. | |

(56) References Cited

U.S. PATENT DOCUMENTS

| | | | |
|---|---|---|---|
| 2016/0353465 A1 | 12/2016 | Vrzic et al. | |
| 2016/0359682 A1 | 12/2016 | Senarath et al. | |
| 2016/0373372 A1 | 12/2016 | Gillon et al. | |
| 2016/0381146 A1 | 12/2016 | Zhang et al. | |
| 2016/0381528 A1 | 12/2016 | Lee et al. | |
| 2016/0381662 A1 | 12/2016 | Wang | |
| 2017/0005390 A1 | 1/2017 | Zakaria et al. | |
| 2017/0026887 A1 | 1/2017 | Sirotkin et al. | |
| 2017/0034761 A1 | 2/2017 | Narayanan | |
| 2017/0054595 A1 | 2/2017 | Zhang et al. | |
| 2017/0064591 A1 | 3/2017 | Padfield et al. | |
| 2017/0064666 A1 | 3/2017 | Zhang | |
| 2017/0070892 A1 | 3/2017 | Song et al. | |
| 2017/0078157 A1 | 3/2017 | Zhang | |
| 2017/0078183 A1 | 3/2017 | Civanlar et al. | |
| 2017/0079059 A1 | 3/2017 | Li et al. | |
| 2017/0085493 A1 | 3/2017 | Senarath et al. | |
| 2017/0086049 A1 | 3/2017 | Vrzic | |
| 2017/0086111 A1 | 3/2017 | Vrzic et al. | |
| 2017/0086118 A1 | 3/2017 | Vrzic | |
| 2017/0104688 A1 | 4/2017 | Mirahsan et al. | |
| 2017/0141973 A1 | 5/2017 | Vrzic | |
| 2017/0142591 A1 | 5/2017 | Vrzic | |
| 2017/0150376 A1* | 5/2017 | Shoshan | H04W 24/02 |
| 2017/0150399 A1 | 5/2017 | Kedalagudde et al. | |
| 2017/0164187 A1 | 6/2017 | Lu | |
| 2017/0164212 A1 | 6/2017 | Opsenica et al. | |
| 2017/0164349 A1 | 6/2017 | Zhu et al. | |
| 2017/0164419 A1 | 6/2017 | Kim | |
| 2017/0257276 A1 | 9/2017 | Chou et al. | |
| 2017/0257870 A1 | 9/2017 | Farmanbar et al. | |
| 2017/0272978 A1 | 9/2017 | Giloh et al. | |
| 2017/0295535 A1* | 10/2017 | Sherman | H04W 40/22 |
| 2017/0302369 A1 | 10/2017 | Kwoczek et al. | |
| 2017/0303189 A1 | 10/2017 | Hampel et al. | |
| 2017/0318468 A1 | 11/2017 | Aijaz | |
| 2017/0332212 A1 | 11/2017 | Gage | |
| 2017/0339567 A1 | 11/2017 | Li et al. | |
| 2017/0357528 A1 | 12/2017 | Puranik et al. | |
| 2017/0367081 A1 | 12/2017 | Cui | |
| 2018/0124660 A1 | 5/2018 | Zhang et al. | |
| 2018/0131578 A1 | 5/2018 | Cui et al. | |
| 2018/0139109 A1 | 5/2018 | Zuerner | |
| 2018/0302877 A1 | 10/2018 | Bosch et al. | |
| 2018/0316608 A1 | 11/2018 | Dowlatkhah et al. | |
| 2018/0316615 A1 | 11/2018 | Shaw et al. | |
| 2018/0316779 A1 | 11/2018 | Dowlatkhah et al. | |
| 2018/0332441 A1 | 11/2018 | Shaw et al. | |
| 2018/0332442 A1 | 11/2018 | Shaw et al. | |
| 2018/0368060 A1 | 12/2018 | Kedalagudde et al. | |
| 2018/0376407 A1 | 12/2018 | Myhre et al. | |
| 2018/0376412 A1 | 12/2018 | Bischinger | |
| 2019/0014470 A1 | 1/2019 | Bischinger | |
| 2019/0037446 A1 | 1/2019 | Dowlatkhah et al. | |

FOREIGN PATENT DOCUMENTS

| | | |
|---|---|---|
| CN | 104955172 | 3/2014 |
| CN | 105516312 A | 4/2016 |
| CN | 105979542 A | 9/2016 |
| CN | 106257944 A | 12/2016 |
| EP | 2955631 | 12/2015 |
| JP | 5656803 B2 | 1/2015 |
| KR | 101259548 | 5/2009 |
| KR | 101328344 B1 | 11/2013 |
| KR | 20150132774 | 5/2014 |
| KR | 101531834 | 9/2014 |
| KR | 1473783 | 12/2014 |
| WO | 2000067449 | 11/2000 |
| WO | 2014071084 A2 | 5/2014 |
| WO | 2015031512 A1 | 3/2015 |
| WO | 015057960 | 4/2015 |
| WO | 2015057960 A1 | 4/2015 |
| WO | 2015103297 | 7/2015 |
| WO | 2015198087 A1 | 12/2015 |
| WO | 2016051237 | 4/2016 |
| WO | 2016126238 A1 | 8/2016 |
| WO | 2016126347 A1 | 8/2016 |
| WO | 2016141518 A1 | 9/2016 |
| WO | 2016162467 A1 | 10/2016 |
| WO | 2016192639 A1 | 12/2016 |
| WO | 2016206372 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017054841 | 4/2017 |
| WO | 2017057025 A1 | 4/2017 |
| WO | 2017058067 | 4/2017 |
| WO | 2017071228 | 5/2017 |
| WO | 2017074486 A1 | 5/2017 |
| WO | 2017078770 | 5/2017 |
| WO | 2017119844 | 7/2017 |
| WO | 2017123045 A1 | 7/2017 |
| WO | 2017124003 A1 | 7/2017 |

OTHER PUBLICATIONS

"Dynamic end-to-end network slicing for 5G", White Paper, https://resources.ext.nokia.com/asset/200339, 2016, 1-10.

"Network Slicing", ericsson.com, Apr. 12, 2017.

"Network Slicing for 5G Networks and Services", 5G Americas™, 5gamericas.org, Nov. 2016.

"The Edge of the Cloud 5G Technology Blog", edgeofcloud.blogspot.com, TechBlogger, pen, Apr. 8, 2017.

Akyildiz, Ian, "Wireless software-defined networks (W-SDNs) and network function virtualization (NFV) for 5G cellular systems: An overview and qualitative evaluation", 2015, 14 pages.

Akyildiz, Ian F. et al., "A roadmap for traffic engineering in Sdn-OpenFlow networks", Computer Networks 71, 2014, 1-30.

Biral, Andrea et al., "The Challenges of M2M Massive Access in Wireless Cellular Networks", Department of Information Engineering of the University of Padova, Mar. 27, 2015, 1-19.

Bor-Yaliniz, et al., "The new frontier in RAN heterogeneity: Multi-tier drone-cells", 2016, 9 pages.

Chen, Xu, "Intelligence on Optical Transport SDN", International Journal of Computer and Communication Engineering 4.1: 5., 2015.

Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), 2014, 1-8.

Deak, Gabriel et al., "IoT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.

Dhekne, et al., "Extending Cell Tower Coverage through Drones", 2017, 6 pages.

Ghavimi, Fayezeh et al., "M2M Communications in 3GPP LTE/LTE-A Networks: Architectures, Service Requirements, Challenges, and Applications", IEEE Communication Surveys & Tutorials, vol. 17, No. 2, Second Quarter 2015, May 9, 2015, 525-549.

Gramaglia, Marco et al., "Flexible connectivity and QoE/QoS management for 5G Networks: The 5G NORMA view", Communications Workshops (ICC), 2016 IEEE International Conference on. IEEE, 2016.

Hakiri, Akram et al., "Leveraging SDN for the 5G Networks: Trends, Prospects and Challenges", arXiv preprint arXiv:1506.02876, Jun. 8, 2015, 1-24.

Inam, et al., "Towards automated service-oriented lifecycle management for 5G networks", 2015, 8 pages.

Katsalis, et al., "5g architectural design patterns", 2016, 7 pages.

Le, Long B., "Enabling 5G Mobile Wireless Technologies", EURASIP Journal on Wireless Communications and Networking 2015.1 (2015): 218., 2015, 1-14.

McCullough, Don, "Why 5G Network Slices?", ericsson.com, Feb. 17, 2015.

(56) References Cited

OTHER PUBLICATIONS

Nguyen, Van-Giang et al., "SDN and virtualization-based LTE mobile network architectures: A comprehensive survey", Wireless Personal Communications 86.3, 2016, 1401-1438.
Nikaein, Navid et al., "Network store: Exploring slicing in future 5g networks", Proceedings of the 10th International Workshop on Mobility in the Evolving Internet Architecture. ACM, 2015.
Novo, Oscar et al., "Capillary Networks—Bridging the Cellular and IoT Worlds", Internet of Things (WF-IoT), 2015 IEEE 2nd World Forum on. IEEE, 2015., 2015, 1-8.
Open Networking Foundation, "TR-526 Applying SDN Architecture to 5G Slicing", Issue 1, Apr. 2016, 1-19.
Podleski, Lukasz et al., "Multi-domain Software Defined Network: exploring possibilities in", TNC, 2014.
Sayadi, Bessem et al., "SDN for 5G Mobile Networks: NORMA Perspective", International Conference on Cognitive Radio Oriented Wireless Networks, Springer International Publishing, 2016.

* cited by examiner

METHOD AND APPARATUS FOR DYNAMIC INSTANTIATION OF VIRTUAL SERVICE SLICES FOR AUTONOMOUS MACHINES

CROSS-REFERENCE TO RELATED APPLICATIONS

This application is a continuation of and claims priority to U.S. patent application Ser. No. 15/845,323 filed Dec. 18, 2017. The contents of the foregoing are hereby incorporated by reference into this application as if set forth herein in full.

FIELD OF THE DISCLOSURE

The subject disclosure relates to a method and apparatus for an extensive software defined network.

BACKGROUND

There is an expanding ecosystem of devices people use to access applications and information, or interact with others, and monitor or control processes. This ecosystem goes well beyond desktop, laptop, and tablet computers to encompass the full range of endpoints with which humans might interact. Devices are increasingly connected to back-end systems through various networks, but often operate in isolation from one another. As technology evolves, we should expect connection models to expand, flow into one another and greater cooperative interaction between devices to emerge. Cooperative interactions between devices can provide applications across business, industry, law enforcement, military, health, and consumer markets.

BRIEF DESCRIPTION OF THE DRAWINGS

Reference will now be made to the accompanying drawings, which are not necessarily drawn to scale, and wherein.

DETAILED DESCRIPTION

Figure 1:
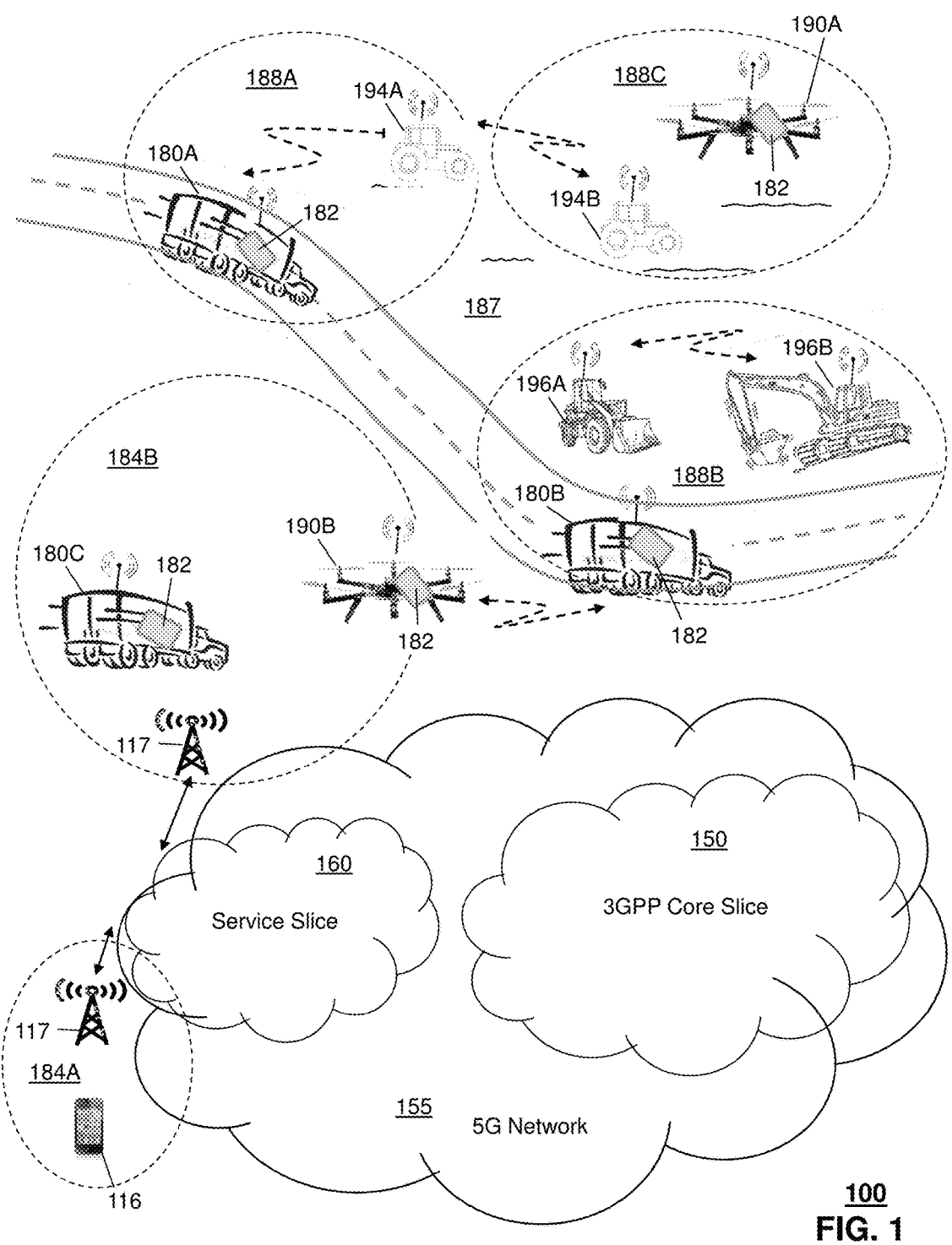
FIGS. 1-2 depict illustrative embodiments of an exemplary communication network for providing services to communication devices.

The subject disclosure describes, among other things, illustrative embodiments for an extensive Software Defined Network (SDN) to provide services, such as downloading of software updates to and uploading of collected data from cellular-capable equipment operating in areas outside of normal cellular network coverage. Vehicles, such as delivery trucks, can be equipped with network extension packages (NESP). The NESP can include baseband units (BBU), remote radio heads (RRH), and packet data network (PDN) management functions, which can allow the NESP equipped vehicle to emulate a cellular network cell, even as the NESP is not actually connected to the core cellular network. As an NESP-equipped vehicle travels down a roadway, it can transmit a cellular communication availability signal for its mobile network cell. When a cellular-capable apparatus (CCA), such as a piece of agricultural equipment, receives the availability signal, the CCA agricultural equipment can request a connection to the mobile network cell. If the CCA agricultural equipment is subscribed to a service of the NESP, then a connection to the mobile cellular cell can be facilitated by the NESP.

Once connected, the NESP can use software-defined networking (SDN) to create a in a micro network slice by dynamically instantiate virtual network functions (VNF) that can support subscribed services for the CCA. For example, CCA agricultural equipment may be subject to a subscription to a software maintenance service. The micro network slice can provide access to this software maintenance service, which can interrogate the CCA agricultural equipment to determine its software status. The NESP can determine that the CCA agricultural equipment requires a software update and can download this update into the CCA agricultural equipment from a software library (since the NESP is not currently connected to the core cellular network). Similarly, the micro network slice of the NESP can support a data collection service, where data can be uploaded from the CCA agricultural equipment. After a connection to the CCA agricultural equipment is terminated, the NESP-equipped vehicle can travel to an area within normal cellular network coverage. At this point, the NESP can connect to the core cellular network and upload information from its interactions with the CCA agricultural equipment. Other embodiments are described in the subject disclosure.

One or more aspects of the subject disclosure include a machine-readable storage medium, including executable instructions that, when executed by a processing system including a processor, facilitate performance of operations, including receiving, from a first cellular-capable apparatus operating in a first area outside of coverage of a cellular network, an authentication request to connect to a non-stationary cellular host. The operations can also include determining, according to the authentication request, whether the first cellular-capable apparatus is subscribed to a first service of a plurality of services supported by the non-stationary cellular host. Responsive to the determining of a subscription of the first cellular-capable apparatus to the service supported by the non-stationary cellular host, the operations can also include facilitating a first cellular connection between the first cellular-capable apparatus and the non-stationary cellular host. The operations can include determining a first set of virtual network functions required to facilitate the service for the cellular-capable apparatus, and, in turn, instantiating the first set of virtual network functions at the non-stationary cellular host to generated network slice to facilitate the service. The operations can also include facilitating, via the first cellular connection, the service to the first cellular-capable apparatus according to the first set of virtual network functions to generate first information associated with the first cellular-capable apparatus. The operations can include transferring, via the first cellular connection, the first information associated with the first cellular-capable apparatus.

One or more aspects of the subject disclosure include a non-stationary cellular host device, comprising a processing system including a processor and a memory that stores executable instructions that, when executed by the processing system, facilitate performance of operations, including transmitting a cellular carrier to a first area outside of coverage of a cellular network. Responsive to the cellular carrier, the operations can include receiving, from a first cellular-capable apparatus operating in the first area outside of coverage of a cellular network, an authentication request to connect to the non-stationary cellular host. The operations can further include determining, according to the authentication request, whether the first cellular-capable apparatus is subscribed to a first service of a plurality of services supported by the non-stationary cellular host. Responsive to the determining of a subscription of the first cellular-capable apparatus to the service supported by the non-stationary cellular host, the operations can also include facilitating a first cellular connection between the first cellular-capable apparatus and the non-stationary cellular host. The operations can include facilitating the service to the first cellular-capable apparatus according to a first set of virtual network functions to generate first information associated with the first cellular-capable apparatus. The operations can also include transferring, via the first cellular connection, the first information associated with the first cellular-capable apparatus.

One or more aspects of the subject disclosure include a method performed by a processing system including a processor and including receiving, from a first cellular-capable apparatus operating in a first area outside of coverage of a cellular network, an authentication request to connect to a non-stationary cellular host. The method can include determining, according to the authentication request, whether the first cellular-capable apparatus is subscribed to a first service of a plurality of services supported by the non-stationary cellular host. Responsive to the determining of a subscription of the first cellular-capable apparatus to the service supported by the non-stationary cellular host, the method can also include instantiating, at the non-stationary cellular host a first set of virtual network functions required to facilitate the service for the cellular-capable apparatus. The method can further include facilitating the service to the first cellular-capable apparatus according to a first set of virtual network functions to generate first information associated with the first cellular-capable apparatus.

Figure 2:
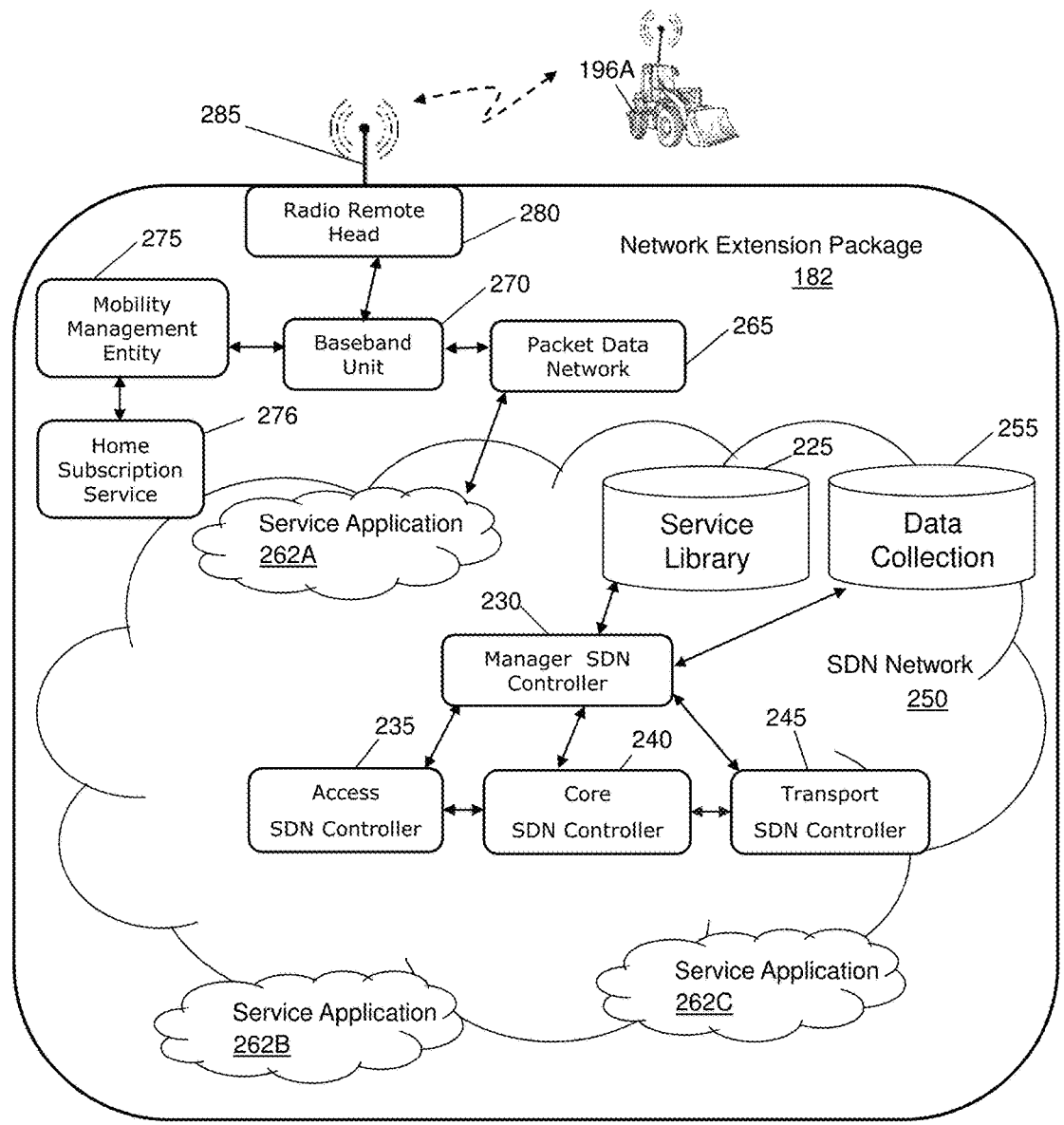

Referring now to FIGS. 1-2, illustrative embodiments of an exemplary communication system for providing services to communication devices is shown. FIG. 1 illustrates a communication system 100 for providing services to cellular-capable apparatus (CCA) 194A-B and 196A-B in areas outside of normal cellular network coverage. For example, the communication system 100 can include a communication network 155, such as a 5G network, for facilitating communication services to various CCA devices 196A that are subscribed to the communication network 155. The communication network 155 can provide access to service slices 160 and to the core network slice 150. The communication network 155 can support a network of coverage areas 184A-B using a large number of cellular base stations 117. While the overall combination of coverage areas 184A-B supported by the communication network 155 may be very large, they may not, in fact, cover every geographic region. For example, certain rural areas and/or large bodies of water may be beyond the reach of the communication network 155.

Connected and/or smart devices are expanding usage, variety, and economic impact. Nearly every industry is now using, or is likely to soon adopt, smart technologies, where devices and apparatus are capable of wireless communication with communication networks. Even industries that are usually relatively late adopters of cutting edge technology, such as farming and construction, are now adopting conventional smart/connected devices such as farm machinery and construction equipment. Even farm animals are being equipped with communication technology to improve tracking, performance, and yield. In these, typically, rural enterprises, technology rollout faces an added challenge of underdeveloped communication networks. Smart farm machinery 194A, for example, may be operated in areas that are far outside the coverage of the typical communication networks 150.

However, in spite of the network availability challenges, there are substantial benefits in equipment performance, maintenance, uptime, cost of ownership, and/or customer satisfaction that can be achieved by providing network connectivity to these network-challenged, smart devices, even if this connectivity is intermitted. For example, a cellular-capable apparatus (CCA) agricultural equipment 194A operating in a remote location that is beyond the reach of the nominal communication network 155 can, if provided intermitted connectivity, upload and/or download highly useful data. For example, a periodic update from the CCA agricultural equipment 194A can provide highly useful information on how farm work is progressing. In another example, periodic downloading of software and/or firmware to the CCA agricultural equipment 194A can keep it performing optimally.

Unfortunately, in many use cases, the smart equipment may be operating in areas, where there is no network coverage to communicate with central command center for exchanging information, storing collected data, and/or receiving an update of software and/or working schedules. Unless these smart equipment is moved into the coverage area of the communication network 155 or to an area that is indirectly connected to the communication network 155, such as at a Local Area Network (LAN) location, such as a farm house, the smart equipment cannot benefit from its networking capabilities. The solution of moving the smart equipment 194A to the network connectivity is not optimal since the smart equipment 194A-B and 195A-B may be operating far from the point of connection and may have to move constantly. In another example, smart device equipped farm animals may feed far from the network accessible location (e.g., the farmhouse), such as in the mountains. Further, the farmer have very little control over their movement except during a few times during the year. In another example, movement of the smart equipped devices may simply not be possible, as in the case of CCA oil rigs and/or large equipment operating in middle of ocean. Smart equipment and/or smart devices coupled to various entities, such as large equipment, farm animals, and/or ocean animals needs to access the communication network 155, at least on some periodic basis, to maintain certain service levels and/or to properly support these smart applications in the field.

In one or more embodiments, smart devices and/or equipment can be periodically visited by a mobile communication network. CCA apparatus 194A-B and 196A-B, such as smart agricultural equipment, construction equipment, and smart communications equipped farm animals, oil drills, wells, and platforms, or any other equipment or devices capable of cellular communications, can be operating in an area 187 that is not covered by a communication network 155. A vehicle 180A-C or other mobile platform 190A, such as a truck, car, airplane, drone, boat, submersible, can be equipped with a network extension package (NESP) 182. The NESP 182 can include radio communication and networking functionality so that the NESP 182 can perform as a mobile cellular station or non-stationary cellular host. When a vehicle, such as a delivery truck 180A drives into the area 187 that is not covered by the communication network 100, the NESP can provide its own mobile cellular network coverage area 188A, at least during the time period when the vehicle 180A is in that area 180A. Any NESP equipped vehicle 180A-C or 190A can act as a mobile cellular host device and provide a temporary cellular coverage area 188A-C.

In one or more embodiments, the NESP 182 at the vehicle 180A can include a multitude of service applications. The NESP 182 can identify a connecting CCA equipment 194A and determine if the CCA equipment 194A is subscribed to a service of the NESP 182. If the CCA equipment 194A is subscribed, then the NESP 182 can access an internal library of subscription-based service applications and select the service application that matches the CCA equipment 194A. Once the correct service application is determined, the NESP 182 can use a software defined network (SDN) process to instantiate a set of virtual network functions (VNF) that are required for the service application. For example, a delivery truck 180A with built-in NESP 182 can travel to a rural area, where a first manufacturer's agricultural equipment 194A is operating outside of the covered area 184B of the normal communication network 155. The NESP 182 can identify the first manufacturer's agricultural equipment 194A and can determine that this CCA equipment 194A is subscribed to a first manufacturer's service application that is supported by the NESP 182. The NESP 182 can then generate and instantiate a set of VNF to create a service slice for the first manufacturer's service application at the NESP 182. The first manufacturer's agricultural equipment 194A can communicate with the NESP 182, using the SDN instantiated service slice, "as if" it was connected to the first manufacturer's network over the 5G communication network 155. This connection is, in fact, a closed path, since the NESP 182 is limited to its own resources. However, the NESP 182 can provide valuable services to the CCA equipment 194A, such as invoking an equipment status report, uploading equipment log data, checking the software/firmware version, downloading the revision of software/firmware, and the like.

In one or more embodiments, a delivery truck 180B with the NESP 182 can move into an area 188B, where it connects with second CCA equipment 196A-B, which are manufactured by a second manufacturer. The NESP 182 can identify this new CCA equipment 196A-B and generate a correct second manufacturer service application slice by instantiation of VNF. Similarly, the same delivery truck 180A carrier the NESP 182 can instantiate service slices for multiple manufacturers and can cancel these service slices when communication sessions with various CCA equipment 196B are completed. In another embodiment, the mobile vehicle can be a drone 190A-190B that can fly over areas that are not covered by the communication network 155. The NESP 182 that is carried by the drone 190A can generate its own mobile coverage area 188C and provide services to CCA equipment 194B in that area. In one or more embodiments, the CCA equipment can include any cellular-capable device, including animal collars or tags worn by livestock or wildlife or even people. Depending of the type of animal (e.g., farm animal, wildlife, endangered species), the NESP 182 can select and instantiate a suitable service slice VNF for collecting information from the animal's CCA device.

In one or more embodiments, the NESP 182 equipment vehicles can encounter CCA equipment 194A and intelligently instantiate dedicated service slices for providing services to these temporarily connected devices. The benefits of such a system include providing easy access to CCA devices 194A that are operating outside of typical network coverage for use in maintenance and data collection. A single moving vehicle 180A can significantly extend the virtual reach of the cellular communication network while connecting to a large number of CCA devices 194A. By placing the NESP units 182 on a large number of vehicles and vehicle types (land, air, and water), the network reach can be extended to anywhere, from farms in Alaska to oceans and mountains. The commercial benefits are especially apparent for farming, forestry, ocean transport, scientific study, and petroleum applications spanning the globe, especially in underdeveloped places and remote locations. In one or more applications, the NESP system 182 can include an internal repository with all the service applications and all of the VNFs that are needed to for each type of service, customer base, manufacturer, and so forth.

In one or more embodiments, the vehicle 180C carrying the NESP unit 182 can reenter the coverage area 184B of the communication network 155, so that the NESP 182 can exit its standalone mode and connect to the core cellular network 155 via a cellular base station 117. The NESP 182 is then able to access the any aspect of the core cellular network 155, including the World Wide Web. When connected to the main cellular network 155, the NESP 182 can enhance, update, and/or replace its library of service applications, upload data it has collected from remote CCA devices 194A, report on upgrades to CCA equipment 196B, and respond to inquiries from other device 116 that are also connected, directly or indirectly, to the communication network 200.

In one or more embodiments, the NESP 182 can extend its own reach, even while not able to directly access the main cellular network 155, by accessing a mesh network. For example a NESP 182 carried by a delivery truck 180B can be traveling outside of the coverage area 184B for the cellular network 155. The NESP 182 for the delivery truck 180B can establish cellular communications with another NESP 182 carried by another vehicle, such as a drone 190B. In this case the drone 190B is, in fact, operating in the coverage region of the cellular network 155 and is, therefore, able to connect to the cellular network 155 through the cellular base station 117. The drone 190B can serve as a mesh connection for the delivery truck 180B to access the cellular network 155. Messages and data can be passed between the cellular network 155 and the NESP 182 of the delivery truck 180B via the NESP 182 of the drone 190B. Similarly, this concept can be extended so that a series of mesh connections can be used to allow a remote NESP 182 to communicate with the cellular network 155. Likewise, a remote CCA device 196B can communicate, indirectly, with the cellular network 155 via a nearby NESP 182 and a series of mesh connections to other NESP 182 bearing vehicles. The mesh connections allow for an ad hoc connection mode, such as peer-2-peer, to extend a local and relatively short range cellular connection over a relatively large distance.

In one or more embodiments, cellular service can be extended outside of the coverage area for any CCA device, including mobile communication devices such as cellular phones. The NESP 182 can include service applications for use by hikers or first responders operating in the backcountry. Temporary connections to NESP units 182 that are "passing through" can be useful for passing messages to/from people via any CCA device.

FIG. 2 illustrates embodiments of the communication system 100 showing further embodiments of the NESP 182 units that are carried on the vehicles 180A. In one or more embodiments, the NESP 182 units can include radio components, such as a Radio Remote Head (RRH) 280 and a Baseband Unit (BBU) 270. The RRH 280 can include radio frequency (RF) circuitry that couples to one or more antennas 285 for transmitting and receiving wireless signals. The RRH 280 can also include analog-to-digital converters (ADC) and/or digital-to-analog converters (DAC) for converting between the digital processing domain and the analog input/output domain. The BBU 270 can include a digital processing unit for encoding signals to and decoding signals from the baseband carrier signals. The radio components 280 and 285 allow the NESP 182 to support its own radio access network (RAN) for connecting to one or more cellular-capable apparatus (CCA) devices 196A that are operating in its coverage area. In one or more embodiments, the NESP 182 can also include mobility functions, such its own mobility management entity (MME) 275 and packet data network (PDN) 265. The MME 275 can support connection, subscription authentication, and data setup for CCA device 196A that have attached to the radio components 285, 280. The PDN 265 can facilitate a data path between a subscribed CCA device 196A and one or more service application 262A-B that can execute on the NESP 182.

In one or more embodiments, the radio components 270, 280 can perform operations consistent with the 3GPP standard. In one or more embodiments, the radio components 270, 280 can transmit a cellular signal to the coverage area indicating that the NESP 182 is present and available for CCA devices 194A to form a cellular connection. The radio components 270, 280 can receive a request for attachment from a CCA device 194A and can forward this request for attachment to the MME 275. An authentication request for the CCA device 194A can be flow to the MME 275, for example, via a Non-Access Stratum (NAS) protocol message. The NAS protocol authentication request can flow directly from the CCA device 194A to the MME 275. In one embodiment, at the MME 275, the authentication request can be converted to an Internet Engineering Task Force (IETF) standard authentication message protocol. The converted, authentication message can be forwarded to a Home Subscription Service (HSS) 276 at the NESP 182 for verification of the authentication request for the CCA device 194A. In one or more embodiments, the HSS 276 can provide a central database that contains user-related and subscription-related information. The functions of the HSS 276 can include mobility management, user authentication, and access authorization. In one embodiment, the HSS 276 can manage subscription-related information in real time, for multi-access and multi-domain offerings.

Upon detecting the cellular signal of the NESP 182, the CCA device 194A can automatically seek to connect to a NESP 182. In one or more embodiments, the CCA device 194A can be configure to only seek a connection to the NESP 182 if it does not have any type of connectivity with a cellular link over a certain time period. The CCA device 194A can also enter into an IDLE mode if it does not detect a cellular signal for a time period in excess of a configuration and use this IDLE mode to preserve its battery life. Where the NESP 182 is present at the coverage area for a long period of time—such as if the vehicle 180A bearing the NESP 182 is idling at the location for a long time—then the CCA device 194A, the RAN 270 and 280 of the NESP 182, and the MME 275 can support an extended IDLE mode DRX capability that can save radio transmission power, as well as further extend the battery life of the CCA device 194A. An internal or external trigger can cause the CCA device 194A to transmit data. In this case, the CCA device 194A may need to establish a data connection to be able to engage in data transfer with the NESP 182 and/or a service application 262A.

In one or more embodiments, where the HSS 276 returns a successful authentication of the CCA device 194A, the MME 275 can also perform control plane functions for enabling the PDN 265 to support packet communications with the service application 262A. In one embodiment, the MME 275 can assign one or more bearer gateways for use in transporting user data to and from the CCA device 194A. For example, the MME 275 can assign one or more default bearer gateways and/or one or more dedicated bearer gateways at the PDN 265.

In one or more embodiments, a NESP 182 can include a Software Defined Network (SDN), or SDN Network 250. The SDN Network 250 can be controlled by one or more SDN Controllers. For example, the SDN network 250 can include a Manager SDN Controller 230, an Access SDN Controller 235, a Core SDN Controller 240, and/or a Transport SDN Controller 245. The functions of the different types of SDN Controllers 230-245 are further described below. Each SDN Controller, such as, for example and ease of illustration, the Manager SDN Controller 230, can be provided by a computing system executing computer-executable instructions and/or modules to provide various functions. In one or more embodiments, multiple computer systems or processors can provide the functionality illustrated and described herein with respect to each SDN Controller 230. To simplify the description of the concepts and technologies described herein, each SDN Controller 230 is illustrated and described herein as being provided by a single computing system. However, it should be understood that this example is illustrative and therefore should not be construed as being limiting in any way.

In a communication network, communication services are typically provided by vendor equipment, which is custom made and/or configured during installation to provide functions necessary for providing desired services. When changes are made to the network, service instantiation and management can require substantial labor to accommodate and/or incorporate new equipment, which may result delayed service instantiation and a system that demonstrates poor dynamic response to changes in network demand. In addition, network flows are generally controlled by a control plane that is associated with the vendor equipment. However, the control plane is often integrated with the data or user plane such that changes to a network element may require re-definition or reconfiguration of a service.

Operation support systems ("OSS") can currently be used to create and/or configure services. However, the process for determining system needs and instantiating equipment can be slow (non-dynamic) and labor intensive, where the service is defined and specified, configured for a chosen vendor network element, coded into a software architecture, and tested.

Some communication network providers are turning to Software Design Network (SDN) solutions to improve network flexibility and change dynamics. For example, network providers may use a SDN controller for provisioning resource and capacity for a mobility core network. However, in these configurations, the core network is a fixed asset within the communication network. SDN controller provisioning can alter performance or control plane assignment of mobility core network components but does not create a fully distributed and dynamically responsive system nor a system that can predict and provide capacity and resource requirements.

In one or more embodiments, each SDN Controller 230 can include various components and/or can be provided via cooperation of various network devices or components. For example, each SDN Controller 230 can include or have access various network components or resources, such as a network resource controller, network resource autonomous controller, a service resource controller, a service control interpreter, adapters, application programming interfaces, compilers, a network data collection and/or analytics engine. Each SDN Controller 230 also can include or access information describing available resources and network information, such as network object statistics, events or alarms, topology, state changes. In one or more embodiment, each SDN Controller 230 can use and/or can generate and/or access system configurations, including configurations of resources available to the Manager SDN Controller 230 for proving access to services.

In one or more embodiments, the communication system 200 can include a Service Library 225. The Service Library 225 can provide access to third-party services and applications at a higher application layer. In one or more embodiments, the NESP 182 can include an SDN Network 250. The SDN Network 250 can include one or more SDN Controllers 230, 235, 240 and 245 that can provide different types of functions and can be arranged in virtual layers. For example, the SDN Network 250 can include a Manager SDN Controller 230 that controls and coordinates functioning of the SDN Network 250. The Manager SDN Controller 230 can be a top-level Management System in the architecture. Below the Manager SDN Controller 230, a next level of SDN Controllers 235, 240 and 245 can be instantiated and configured by the Manager SDN Controller 230 to provide specific classes of functionality in the architecture. For example, the Manager SDN Controller 230 can provide level 3 functionality to control and coordinate service control, configuration, and data flow in the NESP 182. The Manager SDN Controller 230 can, as needed, instantiate, configure, and direct level 2 SDN Controllers 235, 240 and 245 for controlling Access, Core, and Transport capabilities in the NESP 182.

In one or more embodiments, the SDN Network 250 can allow the NESP 182 to separate control plane operations from a data plane operations and can enable layer abstraction for separating service and network functions or elements from physical network functions or elements. In one or more embodiments, the Manager SDN Controller 230 can coordinated networking and provision of applications and/or services. The Manager SDN Controller 230 can manage transport functions for various layers within the communication network and access to application functions for layers above the communication network. The Manager SDN Controller 230 can provide a platform for network services, network control of service instantiation and management, as well as a programmable environment for resource and traffic management. The Manager SDN Controller 230 also can permit a combination of real time data from the service and network elements with real-time or near real-time control of a forwarding plane. In various embodiments, the Manager SDN Controller 230 can enable flow set up in real-time, network programmability, extensibility, standard interfaces, and/or multi-vendor support. In one embodiment, interactions between layers of the NESP 182 can be based upon policies to determine optimum configuration and rapid adaptation of the NESP 182 to changing state and changing customer requirements for example, predicted demand, addition of new users, spikes in traffic, planned and unplanned network outages, adding new services, and/or maintenance.

In one or more embodiments, the SDN Network 250 can support legacy and emerging protocols through the use of adapters, including, but not necessarily limited to, configurator or adapters that can write to the network elements, and listening adapters that can collect statistics and alarms for the data collection and analytic engine as well as for fault and performance management. Modularity of the Manager SDN Controller 230 can allow the enable functions, such as compiling, service control, network control, and data collection and analytics, to be optimized and developed independently of the specific vendor network equipment being controlled.

In one or more embodiments, the SDN Network 250 can enable separation of service control from network resource control. This separation can enable abstraction of service definitions from particular types of network resources that are selected and used for implementation of services. For example, a service can be defined by the Manager SDN Controller 230 independently of actual network layer and vendor specifics. Access service features can be separated from flow service features and can thereby connect to different types of flow services quickly. In one embodiment, customers can access services over a connection that can be added, removed, evolved, combined, or otherwise modified and that may no longer be tied to the service. In one or more embodiments, the Manager SDN Controller 230 can creation of a set of saved configurations, templates, and/or building blocks for creating and providing a service. A customer can pick an access path (e.g., DSL, Broadband, Private Line, IP, VPN, etc.) that is independent of a service that has been selected. In one embodiment, this approach can provide several benefits such as, for example, more rapid instantiation of network elements and addition of new services, matching network features, performance, and capabilities to customer needs on-demand, and allocation of network resources for an individual customer while maintaining network and operational efficiencies.

In one or more embodiments, each SDN Controller 230-245 can instantiate a virtualized environment including compute, storage, and data center networking for virtual applications. For example, the Manager SDN Controller 230 can direct on-demand instantiation of network elements, such as Virtual Network Function (VNF) elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the Manager SDN Controller 230 can cooperate with a cloud orchestrator in instantiating level 2 SDN Controllers 235-245 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level 2 SDN Controllers 235-245 can cooperate with a cloud orchestrator in instantiating VNF elements for use in, for example, the Core Network.

In one or more embodiments, the SDN Controllers 230-245 can be configured to access information describing models of services that can be provided to communication devices. Formal data models and/or templates can be inputs into the network resource controller, which can compile and create the actual steps necessary to configure the vendor specific network elements. The formal information data or models can enable separation of service definitions from vendor specific implementations. In one or more embodiments, for example, the Manager SDN Controller 230 can use service and networking templates stored at or accessible to the Manager SDN Controller 230 and assemble a service from the templates. The Manager SDN Controller 230 can also translate information data and/or models describing services into programmable logic modules, where a programmable logic language can be used to define service and network templates. These templates can be matched to the desired service features, the matched templates can be assembled by the Manager SDN Controller 230. The template-based service representation can be compiled by the software defined network controller, and the compiled template-based service representation can be validated using emulated field test environments to validate the service. After validation, the service can be ready for instantiation on the network and the Manager SDN Controller 230 can interact with network elements to deploy the service and/or can issue commands to effect the deployment.

In one or more embodiments, a CCA device 196A can operate in communication with and/or as a part of a communications network 100. The functionality of the CCA device 196A may be provided by one or more server computers, desktop computers, mobile telephones, smartphones, laptop computers, set-top boxes, other computing systems, and the like. It should be understood that the functionality of the CCA device 196A can be provided by a single device, by two similar devices, and/or by two or more dissimilar devices. For purposes of describing the concepts and technologies disclosed herein, the CCA device 196A is described herein as a workstation or personal computer. It should be understood that this embodiment is illustrative, and should not be construed as being limiting in any way.

The CCA device 196A can execute an operating system and one or more application programs. The operating system can be a computer program that controls the operation of the CCA device 196A. The application programs can be executable programs that are configured to execute on top of the operating system to provide various functions. According to various embodiments, the application programs can include web browsers, productivity software, messaging applications, combinations thereof, or the like. In one or more embodiments, the application programs of the CCA device 196A can include applications that enable interactions between the CCA device 196A and other devices or entities. In some contemplated embodiments, the application programs can provide functionality for interacting with and/or communicating with the NESP 182 and, in turn, having communications analyzed by the Manager SDN Controller 230 or, alternatively, any of the SDN Controllers 230-245 in the SDN Network 250.

According to various embodiments, the SDN Network 250 can include and/or access resources, such as a service orchestrator, a software defined network controller, a cloud orchestrator 116, and/or other elements. It should be understood that the Manager SDN Controller 230, and any of the above-described components, or combinations thereof, may be embodied as or in stand-alone devices or components thereof operating as part of or in communication with the NESP 182. As such, the illustrated embodiment should be understood as being illustrative of only some contemplated embodiments and should not be construed as being limiting in any way.

In one or more embodiments, the SDN Network 250 can enable a shortened service conception-to-deployment timeline, as well as enabling improved service management functionality. In particular, the Manager SDN Controller 230 can receive or obtain the service request from the CCA device 196A or from any other requesting source. According to various embodiments, the service request can be received as a request to order. In one embodiment, the service request can be in the form of a programming language file, which can be written in various languages and/or can include various types of models or the like. In some contemplated embodiments, the service request is provided by one or more Yang files, one or more XML files, one or more hypertext markup language ("HTML") files, one or more scripts and/or programming language files, files in other languages or formats, combinations thereof, or the like.

In one or more embodiments, the SDN Network 250 can automatically evaluate application service requirements that have been requested from the NESP 182. In one embodiment, a service request can be received from a customer or customer device. For example, a request can be receive via a portal. The service request can be provided to the soft Manager SDN Controller 230 for service creation, instantiation, and management. According to various embodiments, the service request can be analyzed by the Manager SDN Controller 230. In one embodiment, the Manager SDN Controller 230 can access or query the Service Library 225 to determine service requirements needed for fulfilling the service request.

In one or more embodiments, the Manager SDN Controller 230 can include, expose, and/or communicate with a portal 220. The functionality of the portal 220 can be provided, in various embodiments, by an application hosted and/or executed by a computing device such as a server computer, a web server, a personal computer, or the like. In some other embodiments, the functionality of the portal can be provided by a module or application hosted or executed by one or more computing devices. Thus, it can be appreciated that the functionality of the portal can be provided by a hardware or software module executed by one or more devices that provide the software defined network framework and/or by other devices. Because the portal can be provided in additional and/or alternative ways, it should be understood that these examples are illustrative and therefore should not be construed as being limiting in any way.

In one or more embodiments, the CCA device 196A can communicate with the NESP 182 via a wireless communication link. For example, the CCA device 196A can be a CCA device 196A that communications via a cellular communication link through a Radio Access Network (RAN) technology. In another example, the CCA device 196A can communication with the communication network via a WiFi network link. The WiFi network can be, for example, a local area network (LAN) that is supported by a router capable of wireless communications or can be an individual device, such another mobile CCA device 196A capable of acting as an intermediary (e.g., a Hot Spot). In one or more embodiments, the NESP 182 can participate in a converged network capable of supporting a wide range of access, core and transport networks, such as wireline, wireless, satellite, 3GGP, non-3GPP, and/or 5G.

In one or more embodiments, the CCA device 196A can establish a session with a portal. The portal can be a function of an application that is resident at the CCA device 196A as a stand-alone application or as a client application to a server application of the communication network 100 or a third party. The portal functionality enables the CCA device 196A to define or request particular service features either directly or indirectly. According to various embodiments, the CCA device 196A can provide to the portal, or can define via the portal, a service request. In one or more embodiments, the service request can include service feature data that represents service features desired or needed in a service being created and/or instantiated via the Manager SDN Controller 230. Alternatively, the service request can be a bare request for access to a service. In this case, the Manager SDN Controller 230 can determine the nature of the service and the functionality/resources required for providing the service.

In one or more embodiments, a Management Gateway (MGW) can be included in the NESP 182. The MGW can capture traffic entering the NESP 182 from various CCA devices 196A and various Access Networks (AN). The MGW can communicate with the SDN Network 250, such as a Manager SDN Controller 230, regarding traffic entering the NESP 182. In one embodiment, the MGW 242 and the Manager SDN Controller 230 can communicate via an OpenFlow protocol. The MGW can inform the Management SDN Controller 230 of information regarding services sought by one or more communication devices 230. The Management SDN Controller 230 can analyze these services to determine service functions and/or network data flows that would be required to facilitate delivery of these services to the CCA devices 196A.

In one or more embodiments, the Manager SDN Controller 230 can query the Service Layer 225 to determine the functional and/or resource requirements to provide the service to the CCA device 196A. In one or more embodiments, the service requirements can include service feature data. In one or more embodiments, this service feature data can be generated by or provided to the Service Layer 225 and/or the Manager SDN Controller 230 via interactions between the CCA device 196A and the portal. For example, in the process of making the service request, the CCA device 196A can make a series of selections from menus, drop-down lists, fields, tables, or other data or object selection mechanisms that may be provided by the portal and/or the application programs executing on the CCA device 196A. In some embodiments, the application programs can include a web browser application or other application that can obtain data from the portal. In one or more embodiments, the application programs can use the data to generate and present a user interface at the CCA device 196A. The user interface can include possible service features, and a user or other entity can select the desired features, drag and drop desired features, and/or otherwise indicate desired features in a service.

In one or more embodiments, regardless of the specific technique for capturing and/or deriving service features, using interactions between the CCA device 196A and the portal, and the service feature data can represent feature choices or definitions made. In one embodiment, the portal can be configured to obtain the service feature data and to generate and/or output the service data as a programming file or in a programming file format. In one embodiment, the portal can be supported or directed by the Manager SDN Controller 230. It should be understood that these examples are illustrative and therefore should not be construed as being limiting in any way.

In one or more embodiments, the SDN Network 250 can analyze the service data or information and identify service features indicated by and/or associated with the requested service. Based upon the service request and/or service data, the Manager SDN Controller 230 can identify one or more service features associated with a service. As used herein, a "service feature" can be used to refer to an operation, a set of operations, a process, a method, a combination thereof, or the like associated with a service. It therefore can be appreciated that any function, functionality, set or subset of functions or functionality, processes or set of processes, method flows, work flows, combinations thereof, or the like can correspond to a service feature. As such, the above example should be understood as being illustrative of one example feature and therefore should not be construed as being limiting in any way.

In one or more embodiments, the Manager SDN Controller 230 can analyze the service request and/or other implementation of the service data to identify each of one or more features associated with the requested service. The identification of service features can be iterated by the Manager SDN Controller 230 until each feature is identified. Upon determining that additional features associated with the service do not remain, the Manager SDN Controller 230 can generate and select a service model, template, and/or program that represents the requested service. In one embodiment, the Manager SDN Controller 230 can receive a service model.

In one or more embodiments, the Manager SDN Controller 230 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the Manager SDN Controller 230 can determine from the service model one or more physical network functions or other resources that will be needed or used to support the service. The Manager SDN Controller 230 also can analyze the service model to identify one or more virtual network functions or other functions that will support or provide the features of the service. The Manager SDN Controller 230 also can determine, via analysis of the service model, process flows between the various resources and/or functions used to support or provide the service features.

In one or more embodiments, the Manager SDN Controller 230 can select service and networking templates stored at or accessible to the Manager SDN Controller 230. Features requested in the service request can be matched to the templates, and the Manager SDN Controller 230 can assemble a service from the templates. In one embodiment, the Manager SDN Controller 230 can compile the assembled templates and with a real time network map, create a directed graph that can configure the network elements based on a specific sequence defined by the directed graph. Upon successful validation, the Manager SDN Controller 230 can interact with network elements such as a service orchestrator and a cloud orchestrator to instantiate resources to perform functions, including computing, storage, and local networking in a virtual environment, and to instantiate the service. In one or more embodiments, the Manager SDN Controller 230 can configure physical and virtual network functions and a cloud orchestrator can instantiate the virtual network functions (e.g., virtual machines ("VMs")). After virtual network function instantiation, the Manager SDN Controller 230 can configure, monitor, and manage the service. In one or more embodiments, the Manager SDN Controller 230 can receive or get events from the network and trigger a directed graph to execute the logic of the intended service, feature, or flow.

In one or more embodiments, if the SDN Network 230 implements a multiple level, dynamic design, then the Manager SDN Controller 230 of the SDN Network 250 can automatically prioritize and instantiate a next lower level (e.g., level 2) SDN controller including an Access Network SDN Controller 235, a Core Network SDN Controller 240, and/or a Transport Network SDN Controller 245 on the fly. Generally, the Manager SDN Controller 230 can instantiating at least one set of these level 2 SDN Controllers 235-245 to provide baseline functionality and connectivity for a least one CCA device 196A. As server requests are processed, the Manager SDN Controller 230 can evaluate the service request requirements (i.e., the service features) and compare the required resources and capacities for these resources with the resources and capacities currently available at the SDN network 250 via the level 2 SDN Controllers 235-245. In one embodiment, the Manager SDN Controller 230 can communicate with each of the instantiated SDN controllers via a communication interface, such as an OpenFlow interface. In addition, the SDN Controllers 235-245 of level 2 to can communicate among themselves to determine resource capabilities, capacities, shortages, failures, and/or warnings. In one or more embodiments, if the Manager SDN Controller 230 determines that the requested service can be performed, within system margins, using the currently instantiated SDN Controllers 235-245, then the Manager SDN Controller 230 can decide to direct the SDN Controllers 235-245 to perform the service for the CCA device 196A. Alternatively, if the Manager SDN Controller 230 determines a shortage or shortfall in a needed resource, then the Manager SDN Controller 230 can direct instantiation of one or more new SDN Controller 235-245 to perform all or part of the requested service. For example, the Manager SDN Controller 230 may determine that the service request associated with the CCA device 196A or many CCA devices 196A or merely received at the communication network 220 from an indeterminate device (e.g., a request for resources from another network) requires additional Core SDN Controller capacity 240. In this case, the Manager SDN Controller 230 can direct the instantiation of additional Core SDN Controller 240 capacity from a set of configurable SDN Controller devices at the cloud.

In one or more embodiments, level 2 SDN Controllers 235-245, including Access SDN Controller 235, Core SDN Controller 240, and Transport SDN Controller 245 can control devices at level 2 of the NESP 182. For example, the Access SDN Controller 235 can control, direct, configure, and monitor Access Resources for the NESP 182, such as the RAN resources. In another example, the Core SDN Controller 240 can control, direct, configure, and monitor Core Resources for the NESP 182.

In one or more embodiments, the level 3 Manager SDN Controller 230 can manage one or more sets of level 2 SDN Controllers 235-245 in the SDN Network 250. The Manager SDN Controller 230 can configure and/or reconfigure the instantiated SDN Controllers 235-245 to optimize the SDN Network 250 according to loading created by the service requests. For example, the Manager SDN Controller 230 can invention automatically instantiate multiple levels of fully distributed SDN Controllers 235-245. Likewise the level 2 SDN Controllers 235-245 can instantiate and/or configure and/or reconfigure VNF elements at level 2. Each of the SDN Controllers 230-245 can support instantiation "on the fly" based on new requests, the ending of old requests, monitoring network traffic, and/or requesting loading information from any of the other SDN Controllers 235-245 and/or the VNF elements. For example, the Manager SDN Controller 230 can instantiate and/or decommission SDN Controllers 235-245 into and out from the SDN Network 250 on an on-going basis according to the exchange-to-exchange (E2E) application service requirements. Similarly, the SDN Controllers 235-245 can instantiated and/or decommission and/or reconfigure VNF elements.

In one or more embodiments, the Manager SDN Controller 230 may determine that sufficient resources exist at the currently instantiated Access SDN Controller 235 and Transport SDN Controller 245 resources, however, the priorities of these resources need to be adjusted. For example, where a heavy streaming media loading is identified, the Access SDN Controller 235 and Transport SDN Controller 245 resources may be given higher priority in comparison to the Core SDN Controller 240.

In one or more embodiments, the SDN Controller 230-245 can decide how to use network resources to fulfill the data needs. For example, the Manager SDN Controller 230 can communicate, directly, with the SDN Controllers 235-245 on level 2 (e.g., via Open Flow) and indirectly with the Network Function Virtualization resources on the level 2. In one or more embodiments, the Manager SDN Controller 230 can access service level information associated with the CCA devices 196A. The Manager SDN Controller 230 can determine if the CCA device 196A is associated with a premium service level, for example, and can instantiate additional resources and/or adjust priority levels of currently instantiated resources to provide requested services according to Quality of Service (QoS) levels associated with the service level.

In one or more embodiments, the SDN Controllers 230-245 can access historical information or prospective information to predict resources that may be needed at a time in the future. For example, the Manager SDN Controller 230 can access historical resource demand information associated with the network 200 and/or a particular part of the network. For example, the Manager SDN Controller 230 can determine that the demand for streaming media resources is likely to be very high on a particular day of the week, because historical data indicates that this day is a popular day of the week for streaming data. In another example, the Manager SDN Controller 230 can make this type of predictive determination for a particular CCA device 196A or set of devices 116 based on historical data. In another example, the Manager SDN Controller 230 can access a database with information on triggers that correspond to increased or decreased levels of usage (above or below mean usage). By analyzing and responding to these indicators of out-of-typical usage, the Manager SDN Controller 230 can instantiate additional resources or, if warranted, decommission resources (or reassign to other uses).

In one or more embodiments, the SDN Controllers 230-245 can store models, templates, programs, and/or configurations associated with providing services to communication devices via the NESP 182 Based on the setup, and optionally, on analysis of the performance of the system during the upload of the data, the Manager SDN Controller 230 can determine that the entire setup should be saved for later use.

In one or more embodiments, the SDN Controllers 230-245 can receive real time feedback from network resources during operation. For example, the Manager SDN Controller 230 can receive information from the SDN Controllers 235-245 of the level 2. Alternatively, the Manager SDN Controller 230 can receive information, indirectly, from the level 2 resources and VNF devices. The Manager SDN Controller 230 can use the feedback information to determine the status of the resources that have been assigned by the Manager SDN Controller 230 to provide services. The Manager SDN Controller 230 can determine, for example, that insufficient resources have been instantiated and/or prioritized for a task or for one or more CCA devices 196A. The Manager SDN Controller 230 can then direct the instantiation of additional SDN Controllers 235-245 and/or alteration in configuration and/or priority of SDN Controllers 235-245. Conversely, the Manager SDN Controller 230 can determine that too many resources have been dedicated and decide to either decommission and/or reassign the resources to thereby provide on-the-fly and dynamic response.

In one or more embodiments, each of the Level 2 SDN Controllers 235-245 can instantiate required VNF elements, on-the-fly, in order to fulfill E2E service delivery. In one or more embodiments, rather than leveraging a single level SDN Controller, many SDN Controllers 230 and 235-245 can be used to achieve multiple levels of SDN control and management.

In one or more embodiments, the SDN Network 250 can respond to a request for a service from a CCA device 196A by coordinating and/or implementing a process for the CCA device 196A to access the service. In various embodiments, any of the SDN Controllers 230-245 can be responsible for the process. However, for simplicity of illustration, a non-limiting embodiment featuring a SDN Core Controller 240 is described below. In one or more embodiments, the Core SDN Controller 240 can determining if the CCA device 196A is authenticated to the network 200 and/or authorized to receive the requested service. For example, the Core SDN Controller 240 can receive and process a request for service by querying an authentication server. For example, the Core SDN Controller 240 can query a Home Subscription Server (HSS) for authentication of the subscription status of the CCA device 196A. The Core SDN Controller 240 can further determine if the CCA device 196A is authorized for accessing a requested service by accessing a user profile associated with the CCA device 196A. For example, the Core SDN Controller 240 can determine if the CCA device 196A is participating in a data access plan and, if so, the terms of the data access plan. The Core SDN Controller 240 can access information at equipment of the Service Layer 235 and/or specific Mobile Applications 262A-C and/or Fixed Applications to determine if the CCA device 196A is authorized for a specific service, such as specific video streaming service. In one example, the Core SDN Controller 240 can verify if a client-server relationship between the CCA device 196A and an application service.

In one or more embodiments, the SDN Network 250 can provide network slicing with distributed VNF elements to support diverged types of services and requirements. The network slicing can effectively distribute functionality for facilitating services to CCA devices 196A across the network. The range of services, network and application requirements, and communication loading represented by divergent devices, such as meter readers, vehicle control, and smart phone devices, can create overall system requirements that are not economically feasible via traditional mobility network architectures.

In one or more embodiments, network slicing can be used by the SDN network to support multiple virtual networks behind the air interface(s) 117 of the communication network. The slicing of the network into multiple virtual networks can provide optimal support for different Radio Access Networks (RAN) and/or different service types running across a single RAN. Further, in one or more embodiments, flexible distribution of the access, edge, and core elements of the network cloud can provide optimal support regarding latency and/or service isolation for different apps and service requirements.

In one or more embodiments, the SDN Network 250, such as the Manager SDN Controller 230 and/or the Core SDN Controller 240, can dynamically identifying a proper set of service functions needed for each service that is provided to the CCA devices 196A. In one embodiment, the SDN Controller 240 can generate or compose functions and chaining these functions together for providing the services as functional slices of the overall NESP 182. The functions can be used by the SDN Controller 240 to generate VNF elements. These VNF elements can then be distributed by the SDN Controller 240 to various parts of the NESP 182.

Figure 3:
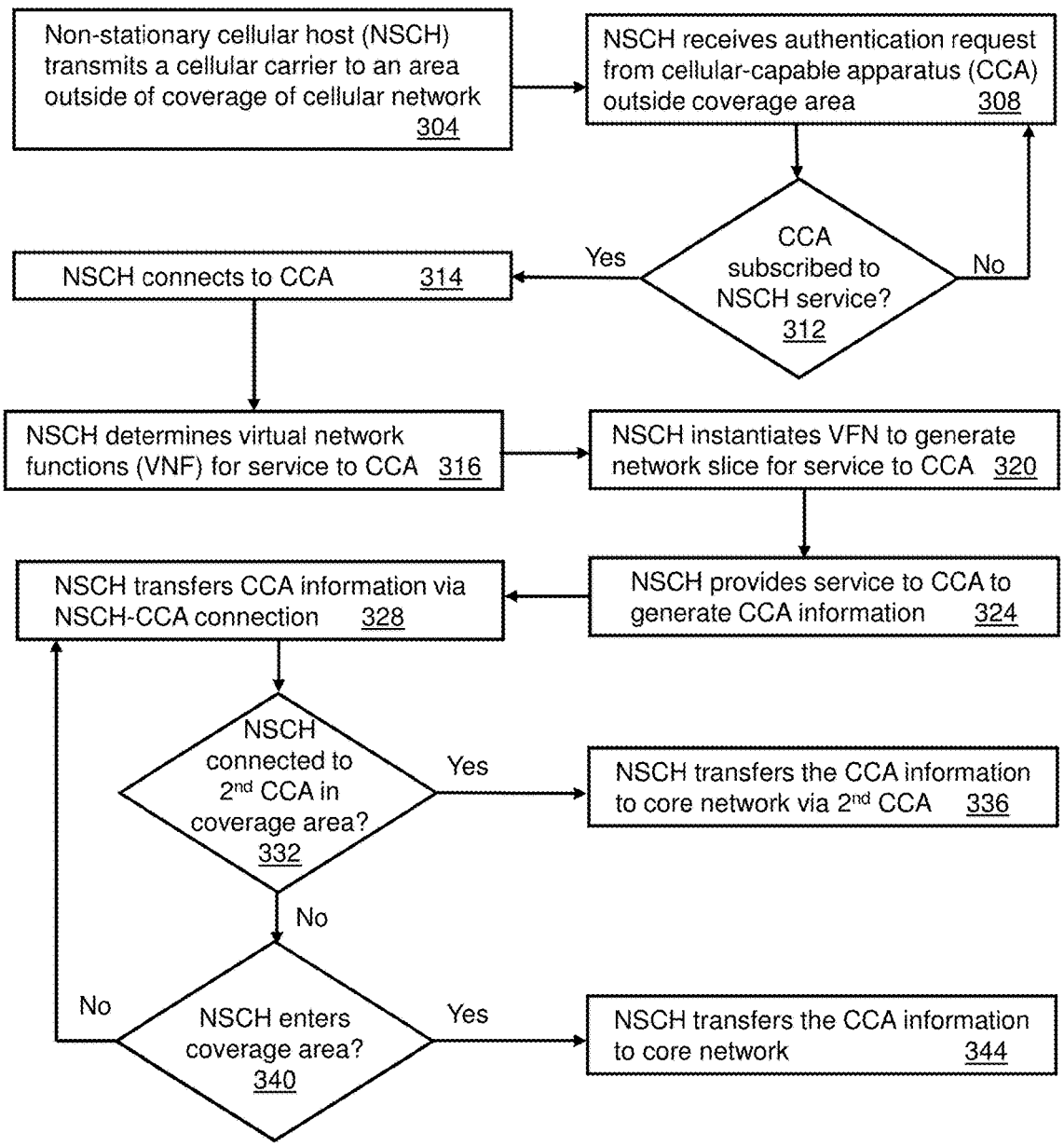
FIG. 3 depicts an illustrative embodiment of a method used in portions of the systems described in FIGS. 1-2.

FIG. 3 depicts an illustrative embodiment of a method used in portions of the systems described in FIGS. 1-2 for providing a responsive SDN communication network. In step 304, a Non-stationary cellular host (NSCH) can transmits a cellular carrier to an area outside of coverage of a cellular network. In step 308, the NSCH can receive an authentication request from a cellular-capable apparatus (CCA) outside a coverage area. In step 312, the NSCH can determine if the CCA is subscribed to a NSCH service. If it is, then, in step 314, the NSCH can facilitate a cellular connection to the CCA.

In step 316, the NSCH can determine virtual network functions needed to for facilitating the service to the CCA. In step 320, the NSCH can instantiate the set of VNF elements into the SDN communication network to generate a network slice for the service to the CCA. In step 324, the NSCH can provide the service to the CCA and, in the process, can generate information. In step 328, the NSCH can transfer the CCA information via the cellular connection between the NSCH and the CCA. In step 332, the NSCH can determine if it is connected to a second CCA that is operating in the coverage area of the network. If so, then, in step 336, the NSCH can transfer the CCA information to the core network via the second CCA. In step 340, the NSCH can determine if it has entered the coverage area of the network. If so, then the NSCH can transfer the CCA information to the core network via its own cellular connection to the network.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
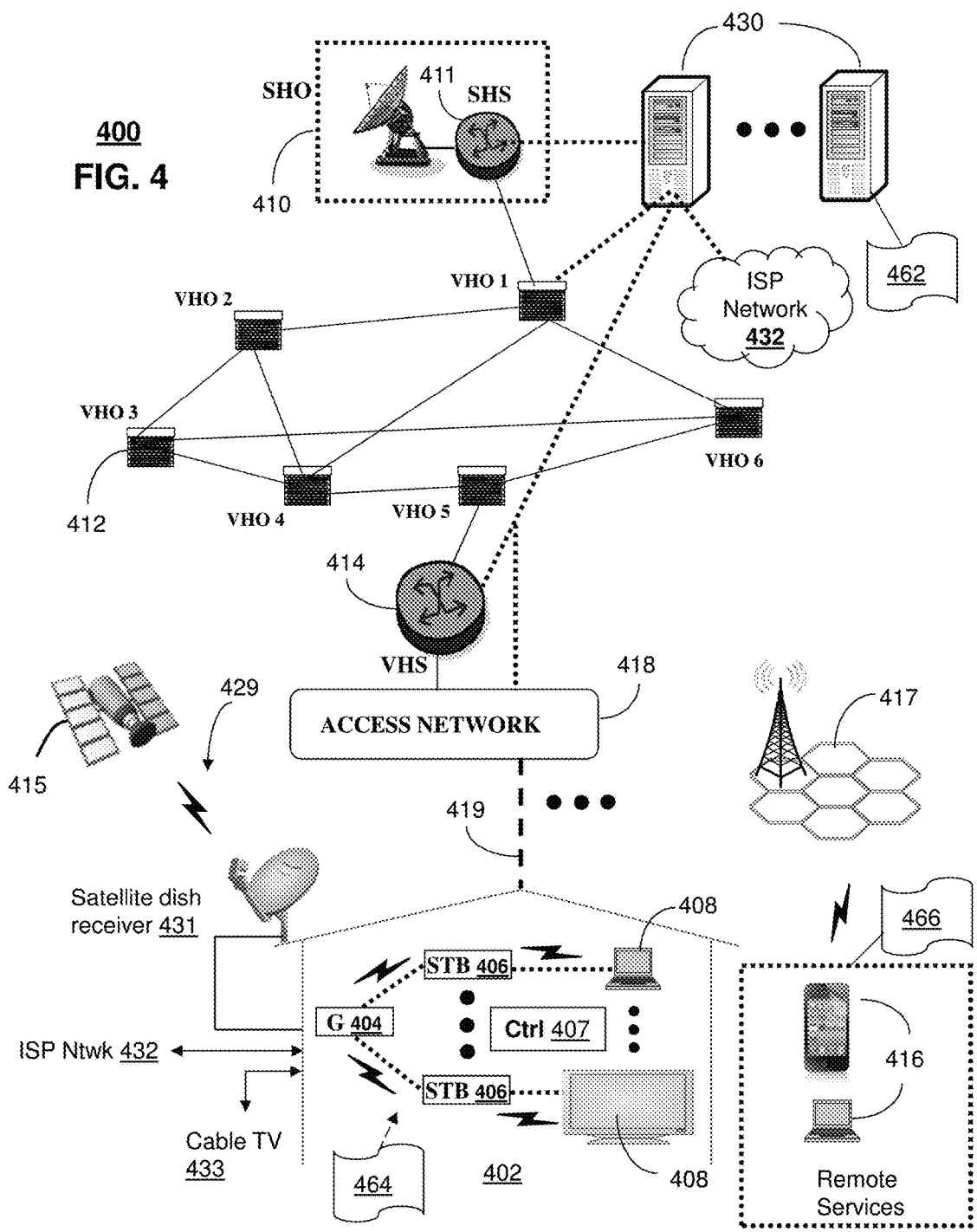
FIGS. 4-5 depict illustrative embodiments of communication systems that provide media services that can be used by the communication network of FIGS. 1-2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIGS. 1-2 as another representative embodiment of communication system 100. For instance, one or more devices illustrated in the communication system 400 of FIG. 4 for a responsive Software Defined Network (SDN), where a SDN Controller can determine service functions and network data path routings required to provide services to one or more devices. The SDN Controller can determine a set of Virtual Network Functions (VNF) that can provide the services and can instantiate this set of VNF elements into the communication network, based on the service function and network data path analysis, such that "slices" of the communication network are placed in network locations that provide advantages in terms of dedicates services, shortened network paths, lower latency, and/or ease of access to devices and/or data for the communication devices that are using the services. The SDN Controller can also monitor the instantiated VNF elements for network resources levels and modify these VNF elements, as needed, to insure optimal performance.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/ or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a Manager SDN Controller. The Manager SDN Controller 430 can use computing and communication technology to perform function 462, which can include among other things, the communication network adaptation techniques described by method 300 of FIG. 3. For instance, function 462 of Manager SDN Controller 230 can be similar to the functions described for Manager SDN Controller of FIGS. 1-2 in accordance with method 300. The media processors 406 and wireless communication devices 416 can be provisioned with software functions 464 and 466, respectively, to utilize the services of Manager SDN Controller 430. For instance, functions 464 and 466 of media processors 406 and wireless communication devices 416 can be similar to the functions described for the CCA devices 196A of FIGS. 1-2 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
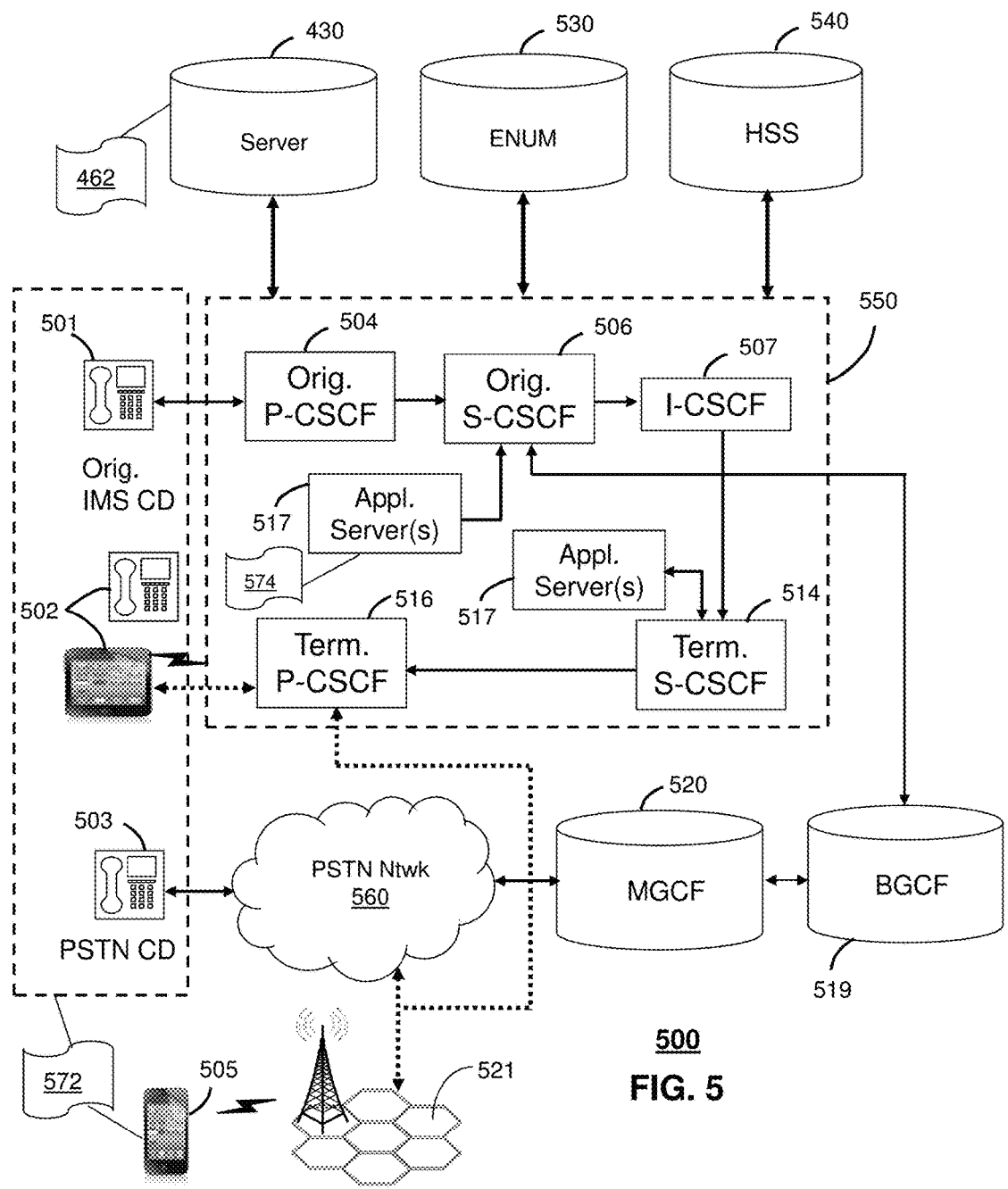

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIGS. 1-2 and communication system 400 as another representative embodiment of communication system 400. The subject disclosure describes, among other things, illustrative embodiments for a responsive Software Defined Network (SDN), where a SDN Controller can determine service functions and network data path routings required to provide services to one or more devices. The SDN Controller can determine a set of Virtual Network Functions (VNF) that can provide the services and can instantiate this set of VNF elements into the communication network, based on the service function and network data path analysis, such that "slices" of the communication network are placed in network locations that provide advantages in terms of dedicates services, shortened network paths, lower latency, and/or ease of access to devices and/or data for the communication devices that are using the services. The SDN Controller can also monitor the instantiated VNF elements for network resources levels and modify these VNF elements, as needed, to insure optimal performance. Other embodiments are described in the subject disclosure.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The Manager SDN Controller 330 of FIG. 5 can be operably coupled to communication system 300 for purposes similar to those described above. Manager SDN Controller 330 can perform function 462 and thereby provide adaptation of the communication system 500 for providing services to the CDs 50', 502, 503 and 505 of FIG. 5 similar to the functions described for Manager SDN Controller 230 of FIGS. 1-2 in accordance with method 300 of FIG. 3. CDs 501, 502, 503 and 505, which can be adapted with software to perform function 572 to utilize the services of the Manager SDN Controller 430 similar to the functions described for CCA devices 196A of FIGS. 1-2 in accordance with method 300 of FIG. 3. Manager SDN Controller 430 can be an integral part of the application server(s) 517 performing function 574, which can be substantially similar to function 464 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 6:
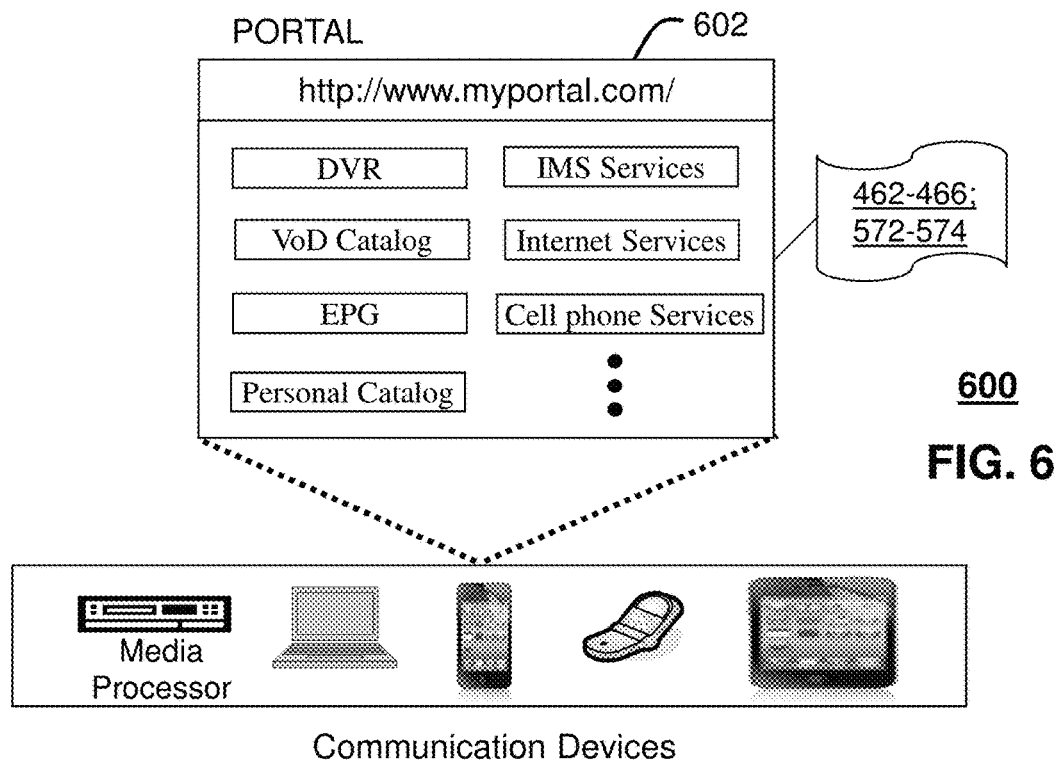
FIG. 6 depicts an illustrative embodiment of a web portal for interacting with the communication systems of FIGS. 1-2 and 4-5.

FIG. 6 depicts an illustrative embodiment of a web portal 602 of a communication system 600. Communication system 600 can be overlaid or operably coupled with system 100 of FIGS. 1-2, communication system 400, and/or communication system 500 as another representative embodiment of system 100 of FIGS. 1-2, communication system 400, and/or communication system 500. The web portal 602 can be used for managing services of system 100 of FIGS. 1-2 and communication systems 400-500. A web page of the web portal 602 can be accessed by a Uniform Resource Locator (URL) with an Internet browser using an Internet-capable communication device such as those described in FIGS. 1-2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIGS. 1-2, and communication systems 400-500. For instance, users of the services provided by Manager SDN Controller 230 or 430 can log into their on-line accounts and provision the Manager SDN Controller 230 or 430 with describe a feature that a user may want to program such as user profiles, provide contact information to server to enable it to communication with devices described in FIGS. 1-2 and so on. Service providers can log onto an administrator account to provision, monitor and/or maintain the system 100 of FIGS. 1-2 or Manager SDN Controller 230.

Figure 7:
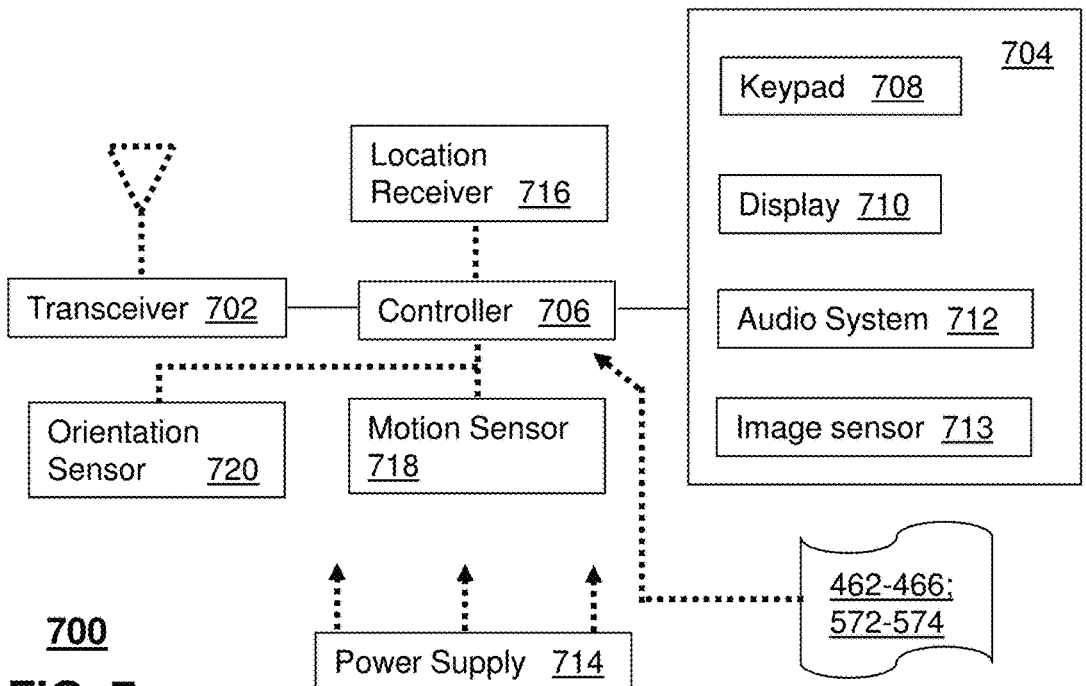
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-2 and FIGS. 3-4 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-2x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 720 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1-2, the media processor 406, the media devices 408, or the portable communication devices 426 of FIG. 4, as well as the IMS CDs 501-502 and PSTN CDs 503-505 of FIG. 5. It will be appreciated that the communication device 700 can also represent other devices that can operate in systems of FIGS. 1-2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
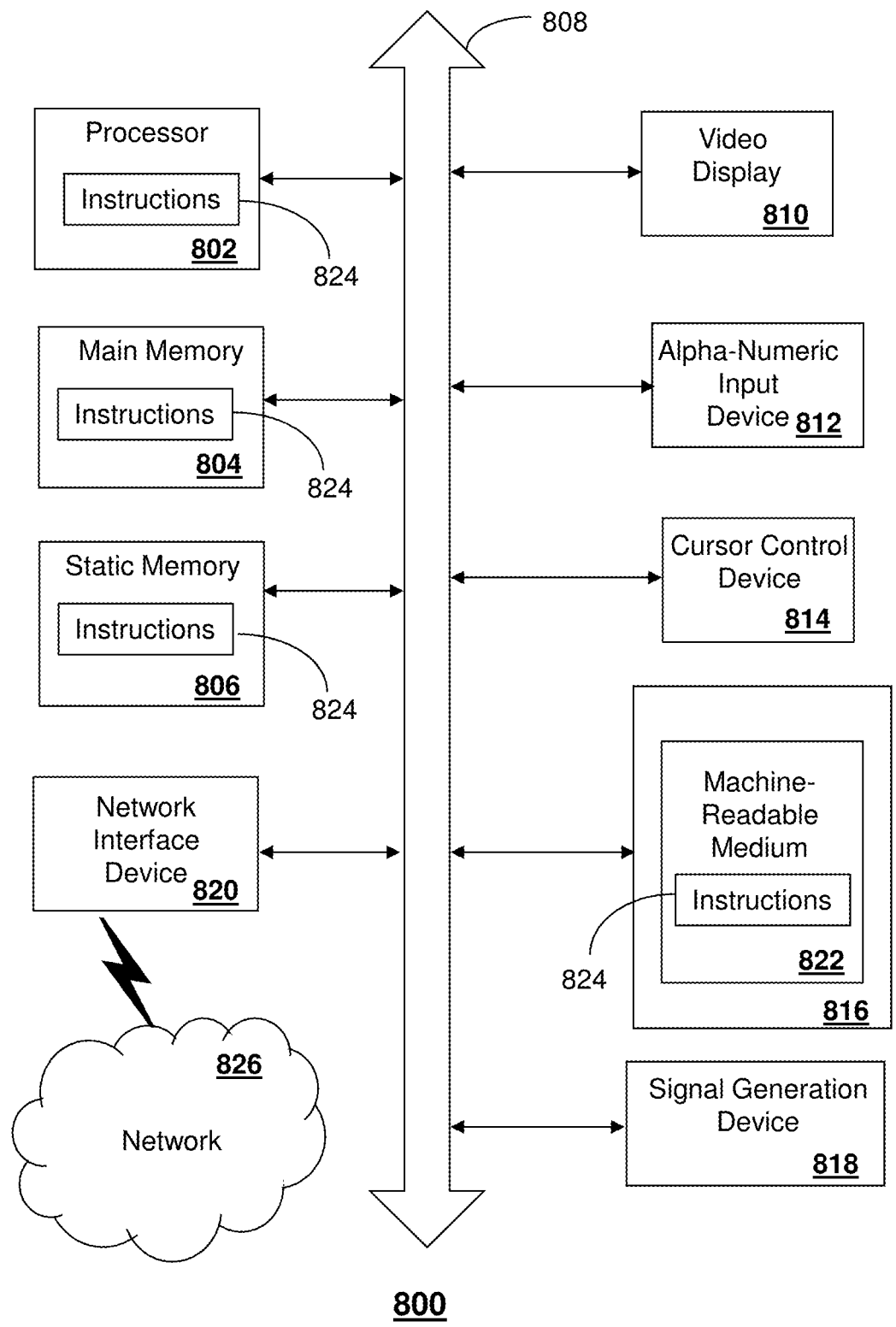
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the Manager SDN Controller 230, the SDN Controllers 235-245, and the CCA device 196A in FIGS. 1-2. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-stationary cellular host device, comprising:
a processing system including a processor; and
a memory that stores executable instructions that, when executed by the processing system, facilitate performance of operations, comprising:
determining whether a first cellular-capable apparatus, operating in a first area outside of coverage of a cellular network, is subscribed to a service; and
responsive to the determining that the first cellular-capable apparatus is subscribed to the service:
instantiating a set of virtual network functions to generate a network slice;
facilitating access, by the first cellular-capable apparatus, to the service via a first cellular connection with the first cellular-capable apparatus to generate first information associated with the first cellular-capable apparatus, wherein the network slice is utilized to provide the service to the first cellular-capable apparatus; and
transferring, via the first cellular connection, the first information associated with the first cellular-capable apparatus.

2. The non-stationary cellular host device of claim 1, wherein the operations further comprise receiving an authentication request from the first cellular-capable apparatus operating in the area outside of the coverage of the cellular network.

3. The non-stationary cellular host device of claim 2, wherein the determining whether the first cellular-capable apparatus is subscribed to the service is further according to the authentication request.

4. The non-stationary cellular host device of claim 1, wherein the operations further comprise facilitating the first cellular connection with the first cellular-capable apparatus responsive to the determining that the first cellular-capable apparatus is subscribed to the service.

5. The non-stationary cellular host device of claim 1, wherein the operations further comprise determining the set of virtual network functions required to facilitate the service to the network slice.

6. The non-stationary cellular host device of claim 1, wherein the operations further comprise:
detecting a second cellular connection to a second cellular-capable apparatus operating in a second area inside of the coverage of the cellular network; and
responsive to the detecting of the second cellular connection to the second cellular-capable apparatus, transferring, second information associated with the first cellular-capable apparatus to the second cellular-capable apparatus via the second cellular connection.

7. The non-stationary cellular host device of claim 6, wherein the second cellular-capable apparatus forwards the second information associated with the first cellular-capable apparatus to the cellular network.

8. The non-stationary cellular host device of claim 1, wherein the operations further comprise:
detecting whether the non-stationary cellular host device has entered a second area inside of the coverage of the cellular network; and
responsive to detecting entrance of the non-stationary cellular host into the second area inside the coverage of the cellular network, transferring, via a second cellular connection with the cellular network, second information associated with the first cellular-capable apparatus.

9. The non-stationary cellular host device of claim 1, wherein the operations further comprise transmitting a cellular carrier to the first area outside of the coverage of the cellular network.

10. The non-stationary cellular host device of claim 9, wherein the operations further comprise receiving, from the first cellular-capable apparatus, an authentication request responsive to the transmitting of the cellular carrier, and wherein the operations further comprise determining, according to the authentication request, whether the first cellular-capable apparatus is authorized to access the service.

11. A machine-readable storage medium, operating at a cellular-capable apparatus, comprising executable instructions that, when executed by a processing system including a processor, facilitate performance of operations, comprising:

receiving, from a non-stationary cellular host device, a cellular carrier in a first area outside of coverage of a cellular network;

transmitting an authentication request to the non-stationary cellular host device responsive to the receiving of the cellular carrier, wherein the non-stationary cellular host device determines whether access to a service is authorized according to the authentication request; and receiving access to the service, wherein the non-stationary cellular host device instantiates a set of virtual network functions to generate a network slice, wherein the non-stationary cellular host device facilitates the access to the service via a first cellular connection with the non-stationary cellular host device to generate first information associated with the service, and wherein the network slice is utilized to provide the service.

12. The machine-readable storage medium of claim 11, wherein the first information associated with the service is transferred by the non-stationary cellular host device via the first cellular connection.

13. The machine-readable storage medium of claim 11, wherein the operations further comprise uploading first data to the non-stationary cellular host device via the first cellular connection.

14. A method, comprising:
determining, by a processing system including a processor, whether a first cellular-capable apparatus, operating in a first area outside of coverage of a cellular network, is subscribed to a service; and responsive to the determining that the first cellular-capable apparatus is subscribed to the service:
  instantiating, by the processing system, a set of virtual network functions to generate a network slice; and
  facilitating, by the processing system, access, by the first cellular-capable apparatus, to the service via a first cellular connection with the first cellular-capable apparatus to generate first information associated with the first cellular-capable apparatus, wherein the network slice is utilized to provide the service to the first cellular-capable apparatus.

15. The method of claim 14, further comprising transferring, by the processing system, the first information associated with the first cellular-capable apparatus via the first cellular connection.

16. The method of claim 15, further comprising:
determining, by the processing system, a current revision level of software executing at the first cellular-capable apparatus; and
determining, by the processing system, whether the software executing at the first cellular-capable apparatus requires an update of the software according to the revision level, wherein the transferring of the first information associated with the first cellular-capable apparatus comprises downloading the update of the software via the first cellular connection.

17. The method of claim 14, further comprising:
determining, by the processing system, a plurality of data path routings to perform a plurality of service functions required for the facilitating of the access to the service by the first cellular-capable apparatus; and
selecting, by the processing system, a service function set of the plurality of service functions according to a characteristic of the plurality of data path routings; and
determining, by the processing system, the set of virtual network functions according to the service function set.

18. The method of claim 17, wherein the characteristic of the plurality of data path routings includes a quality of service achievable via the plurality of data path routings, a security level achievable via the plurality of data path routings, a data latency achievable via the plurality of data path routings, an accessibility of data utilized in the service via the plurality of data path routings, or any combination thereof.

19. The method of claim 14, further comprising transmitting, by the processing system, an authenticating request to a subscription service database via a mobility management entity.

20. The method of claim 14, wherein the set of virtual network functions is instantiated via a software defined controller, wherein the software defined controller detects a level of resource provided by a first virtual network function of the set of virtual network functions to facilitate the access to the service by the first cellular-capable apparatus, and communicates with the first virtual network function to adjust the level of the resource provided responsive to the level of the resource that is detected.

* * * * *